United States Patent
Yoshida et al.

(10) Patent No.: US 8,339,770 B2
(45) Date of Patent: Dec. 25, 2012

(54) CAPACITOR AND METHOD FOR PRODUCING THEREOF

(75) Inventors: Kazuyoshi Yoshida, Kazo (JP); Tailu Ning, Saitama (JP); Hironao Fujiki, Takasaki (JP); Mitsuaki Negishi, Kitakatsushika-gun (JP)

(73) Assignee: Shin-Etsu Polymer Co., Ltd. (JP)

( * ) Notice: Subject to any disclaimer, the term of this patent is extended or adjusted under 35 U.S.C. 154(b) by 663 days.

(21) Appl. No.: 12/280,003

(22) PCT Filed: Feb. 21, 2007

(86) PCT No.: PCT/JP2007/053195
§ 371 (c)(1),
(2), (4) Date: Aug. 20, 2008

(87) PCT Pub. No.: WO2007/097364
PCT Pub. Date: Aug. 30, 2007

(65) Prior Publication Data
US 2010/0165546 A1  Jul. 1, 2010

(30) Foreign Application Priority Data

Feb. 21, 2006 (JP) ................ P2006-043608
Sep. 27, 2006 (JP) ................ P2006-262226
Sep. 27, 2006 (JP) ................ P2006-262227
Sep. 28, 2006 (JP) ................ P2006-264462

(51) Int. Cl.
*H01G 9/02* (2006.01)
*H01G 9/04* (2006.01)

(52) U.S. Cl. .............. 361/525; 361/528; 29/25.03

(58) Field of Classification Search ......... 361/525–527; 29/25.03
See application file for complete search history.

(56) References Cited

U.S. PATENT DOCUMENTS

| | | | |
|---|---|---|---|
| 4,780,796 A | 10/1988 | Fukuda et al. | 361/433 |
| 4,858,078 A | 8/1989 | Morimoto et al. | 361/527 |
| 5,300,575 A | 4/1994 | Jonas | 525/186 |
| 6,128,180 A * | 10/2000 | Araki et al. | 361/525 |
| 6,229,689 B1 * | 5/2001 | Kobayashi et al. | 361/525 |
| 6,671,168 B2 | 12/2003 | Yoshida et al. | |
| 6,987,663 B2 | 1/2006 | Merker et al. | 361/523 |
| 2003/0133256 A1 | 7/2003 | Yoshida et al. | |

(Continued)

FOREIGN PATENT DOCUMENTS

EP  1 471 592 A2  10/2004

(Continued)

OTHER PUBLICATIONS

Office Action dated Jan. 25, 2011 issued in corresponding Japanese Patent Application No. 2007-039109 with English translation (4 pages).

(Continued)

*Primary Examiner* — Eric Thomas
(74) *Attorney, Agent, or Firm* — Ostrolenk Faber LLP

(57) ABSTRACT

A capacitor having a high degree of electric strength, a high electrostatic capacity, and a low ESR, which can be readily downsized, is provided. The capacitor according to the present invention includes an anode made of porous valve metal, a dielectric layer formed by oxidizing the surface of the anode, and a solid electrolyte layer formed on the surface of the dielectric layer. The solid electrolyte layer includes a π conjugated conductive polymer, a polyanion, and an ion-conductive compound.

16 Claims, 1 Drawing Sheet

U.S. PATENT DOCUMENTS

| | | | |
|---|---|---|---|
| 2004/0169163 A1 | 9/2004 | Tsai et al. | 252/500 |
| 2005/0013094 A1 | 1/2005 | Reuter et al. | 361/525 |
| 2005/0111165 A1 | 5/2005 | Merker | 361/525 |
| 2005/0237696 A1 | 10/2005 | Takeda et al. | 361/504 |
| 2005/0248910 A1 | 11/2005 | Merker | 361/525 |
| 2006/0047030 A1 | 3/2006 | Yoshida | 524/99 |

FOREIGN PATENT DOCUMENTS

| | | |
|---|---|---|
| EP | 1 498 920 | 1/2005 |
| EP | 1 598 841 | 11/2005 |
| EP | 1988128 A1 | 11/2008 |
| JP | S63-158829 | 7/1988 |
| JP | S63-173313 | 7/1988 |
| JP | 03-291909 | 12/1991 |
| JP | 5-262981 | 10/1993 |
| JP | 07-090060 | 4/1995 |
| JP | H07-105718 | 4/1995 |
| JP | 08-048858 | 2/1996 |
| JP | 10-308116 | 11/1998 |
| JP | 10-326521 | 12/1998 |
| JP | 11-121279 | 4/1999 |
| JP | 2001-283655 | 10/2001 |
| JP | 2002-373832 | 12/2002 |
| JP | 2003-37024 | 2/2003 |
| JP | 2003-100561 | 4/2003 |
| JP | 2003-289016 | 10/2003 |
| JP | 2005-085947 | 3/2005 |
| JP | 2005-123630 | 5/2005 |
| JP | 2005-203662 | 7/2005 |
| JP | 2006-100774 | 4/2006 |
| JP | 2006-249128 | 9/2006 |
| TW | 200425190 | 11/2004 |

OTHER PUBLICATIONS

Office Action dated Jan. 25, 2011 issued in corresponding Japanese Patent Application No. 2007-055791 with English translation (6 pages).

Office Action dated Jan. 25, 2011 issued in corresponding Japanese Patent Application No. 2007-055792 with English translation (4 pages).

International Search Report and Written Opinion mailed May 22, 2007 in corresponding PCT Internal Application No. PCT/JP2007/053195 with English translation of the Search Report.

Notification (Information Statement) issued on related Japanese Patent Application No. 2007-055791 on Jan. 12, 2010, with English translation, 13 pages total.

Supplementary European Search Report, dated Mar. 25, 2009, issued in corresponding European Application No. EP 07 71 4695, total 7 pages.

Communication dated Mar. 3, 2010 with the extended European Search Report in corresponding European patent application 09015752.0-2214, 6 pages total.

Communication dated Mar. 8, 2010 with the extended European Search Report in corresponding European patent application 09015752.0-2214, 6 pages total.

European Office Action dated Jun. 28, 2011; European Application Serial No. 09 015 751.2 in the name of Shin-etsu Polymet Co, Ltd.

Japanese Notification, dated Oct. 4, 2011, issued in corresponding Japanese Patent Application No. 2007-055791, with English translation. Total 9 pages.

Japanese Notification, dated Oct. 4, 2011, issued in corresponding Japanese Patent Application No. 2007-055792, with English translation. Total 9 pages.

Japanese Office Action dated Nov. 22, 2011, issued in corresponding Japanese Patent Application No. 2007-055791, with English translation (5 pages).

Japanese Decision of Rejection dated Nov. 22, 2011, issued in corresponding Japanese Patent Application No. 2007-055792, with English translation (4 pages).

Taiwan Office Action, dated Jun. 18, 2012, issued in corresponding Taiwan Application No. 096105879. English translation included. Total 12 pages.

European Notice of Opposition, dated Sep. 10, 2012, issued in corresponding European Application No. 07714695.9. English translation included. Total 37 pages.

* cited by examiner

CAPACITOR AND METHOD FOR PRODUCING THEREOF

CROSS-REFERENCE TO RELATED APPLICATIONS

The present application is a 35 U.S.C. §§371 national phase conversion of PCT/JP2007/053195, filed Feb. 21, 2007, which claims priority of Japanese Patent Application No. 2006-43608, filed on Feb. 21, 2006, Japanese Patent Application No. 2006-262226, filed on Sep. 27, 2006, Japanese Patent Application No. 2006-262227, filed on Sep. 27, 2006, and Japanese Patent Application No. 2006-264462, filed on Sep. 28, 2006, the contents of which are incorporated herein by reference. The PCT International Application was published in the Japanese language.

TECHNICAL FIELD

The present invention relates to a capacitor such as an aluminum electrolytic capacitor, a tantalum electrolytic capacitor, or a niobium electrolytic capacitor, and a method for producing the capacitor.

BACKGROUND ART

In recent years, the decrease in impedance (equivalent series resistance) of a capacitor to be used in electronic equipment is required in a high frequency area in accordance with the digitalization of electronic equipment. In order to fulfill the requirement, a functional capacitor (hereinafter, abbreviated as "capacitor") having a coating film formed by oxidizing valve metal, such as aluminium, tantalum, or niobium, as a dielectric substance, has been conventionally used.

Such a capacitor generally has a structure composed of an anode made of porous valve metal, a dielectric layer formed by oxidizing the surface of the anode, a conductive solid electrolyte layer, and a cathode formed by laminating a carbon-layer, a silver-layer, and the like, as shown in Patent Document 1. There is a case in which a conductive film containing a π conjugated conductive polymer is used as the solid electrolyte layer.

An electrolytic polymerization method in which conductive layers of manganese oxide previously formed on the surface of porous valve metal are used as electrodes and an electric current is applied thereto for polymerization (see Patent Document 2), and a chemical oxidation polymerization method in which precursor monomers which serve for a π conjugated conductive polymer are polymerized using an oxidant (see, Patent Document 3) have been widely known as the method for forming the conductive film containing a π conjugated conductive polymer.

In addition to the electrolytic polymerization method and the chemical oxidation polymerization method, a method in which aniline is subjected to chemical oxidation polymerization in the presence of polyanion having a sulfonic group, a carboxylic group, or the like, and the thus obtained solution of water-soluble polyaniline is applied and dried to form a coating film, has been proposed in Patent Document 4, for example, as the method for forming a conductive film. It is considered that a conductive film with high conductivity can be easily formed by such a method.

Patent Document 1: Japanese Laid-Open Patent Application No. 2003-37024.

Patent Document 2: Japanese Unexamined Patent Application, First Publication No. S63-158829.

Patent Document 3: Japanese Unexamined Patent Application, First Publication No. S63-173313.

Patent Document 4: Japanese Unexamined Patent Application, First Publication No. H7-105718.

DISCLOSURE OF THE INVENTION

Problems to be Solved by the Invention

In the case where a solid electrolyte layer of a capacitor is formed in accordance with the method for forming a conductive film as disclosed in any one of Patent Documents 2 to 4, a decrease in the electric strength of the capacitor occurs. In addition, if the electrolytic polymerization method disclosed in Patent Document 2 is adopted, the procedure thereof is complicated because a conductive layer made of manganese oxide is required to be formed, and effects exhibited by the use of the π conjugated conductive polymer with high conductivity is deteriorated because manganese oxide exhibits low conductivity.

If the chemical oxidation polymerization method disclosed in Patent Document 3 is adopted, a long time period is required for polymerization, polymerization is required to be repeatedly performed so as to ensure the film thickness, the efficiency of the conductive film formation is low, and the obtained conductivity is lower than that of the electrolytic polymerization method. If the conductivity of a capacitor is low, the equivalent series resistance (hereinafter, abbreviated as "ESR") is enhanced. In addition, it is difficult to downsize a conventional capacitor with high static electricity, although a small capacity with high static electricity is required.

In addition, the maximum electric strength of a conventional capacitor having a solid electrolyte layer containing a π conjugated conductive polymer corresponds to only 30 to 40% of the formation voltage when a dielectric layer is formed. In addition, the electrostatic capacity thereof corresponds to only 60% of a specific electrostatic capacity when an electrolyte is an electrolytic solution. A method in which a dielectric layer is thickened by enhancing the formation voltage or a method in which the surface of the dielectric layer is coated with an insulating resin may be adopted for the purpose of providing a high degree of electric strength. However, if such methods are adopted, the electrostatic capacity is often extremely decreased to only 10 to 20% of the specific electrostatic capacity. In other words, it is difficult to make electrostatic capacity and electric strength compatible in the conventional capacitor having a solid electrolyte layer containing a π conjugated conductive polymer.

The present invention has for its object the provision of a capacitor which has both a low ESR and a high degree of electric strength, and which can be readily downsized. In addition, the present invention has for its object the provision of a method for producing a capacitor which has both a low ESR and a high degree of electric strength, and which can be readily downsized.

Means for Solving the Problems

The present invention encompasses the following constituents.

(1) A capacitor including: an anode made of porous valve metal; a dielectric layer formed by oxidizing the surface of the anode; and a solid electrolyte layer formed on the surface of the dielectric layer, characterized in that the solid electrolyte layer containing a π conjugated conductive polymer, a polyanion, and an ion-conductive compound.

(2) The capacitor according to (1), in which the ion-conductive compound is a compound having a structure represented by the following Chemical Formula (I):

—(R—O)$_n$—                      (I)

(in the Chemical Formula (I), R represents at least one selected from the group consisting of substituted or unsubstituted alkylenes, substituted or unsubstituted alkenylenes, and substituted or unsubstituted phenylenes, and n represents an integer of 1 to 2,000).

(3) The capacitor according to (2), in which the ion-conductive compound is a compound represented by the following Chemical Formula (II):

X—(R—O)$_n$—Y                    (II)

(in the Chemical Formula (II), R represents at least one selected from the group consisting of substituted or unsubstituted alkylenes, substituted or unsubstituted alkenylenes, and substituted or unsubstituted phenylenes, X represents at least one selected from the group consisting of a hydrogen atom, a hydroxyl group, substituted or unsubstituted alkyl groups, substituted or unsubstituted alkoxyl groups, substituted or unsubstituted alkenyl groups, substituted or unsubstituted aryl groups, substituted or unsubstituted glycidyl groups, substituted or unsubstituted (meth)acryloyl groups, and substituted or unsubstituted oxycarbonyl groups, Y represents at least one selected from the group consisting of a hydrogen atom, substituted or unsubstituted alkyl groups, substituted or unsubstituted alkenyl groups, substituted or unsubstituted aryl groups, substituted or unsubstituted glycidyl groups, substituted or unsubstituted (meth)acryloyl groups, and substituted or unsubstituted carbonyl groups, and n represents an integer of 1 to 2,000).

(4) The capacitor according to any one of (1) to (3), in which the solid electrolyte layer further contains at least one conductive-enhancer selected from the group consisting of nitrogen-containing aromatic cyclic compounds, compounds having at least two hydroxyl groups, compounds having at least two carboxyl groups, compounds having both at least one hydroxyl group and at least one carboxyl group, compounds having an amido group, compounds having an imido group, lactam compounds, and compounds having a glycidyl group.

(5) A capacitor including: an anode made of a porous valve metal; a dielectric layer formed by oxidizing the surface of the anode; and a solid electrolyte layer formed on the surface of the dielectric layer, characterized in that the solid electrolyte layer contains: a π conjugated conductive polymer; a compound having a sulfonic group; and a water-soluble compound or a water-dispersible compound other than the compound having a sulfonic group.

(6) A capacitor including: an anode made of a porous valve metal; a dielectric layer formed by oxidizing the surface of the anode by performing a chemical conversion treatment; and a solid electrolyte layer formed on the surface of the dielectric layer, characterized in that a capacitance appearance ratio obtained in accordance with the following Numerical Formula (I):

capacitance appearance ratio(%)=(electrostatic capacity($F$)/specific electrostatic capacity($F$))×100    Numerical Formula (I)

is 70 to 100%, and the ratio of "electric strength (V)/formation voltage (V)" is 0.5 to 1.0.

(7) The capacitor according to (6), in which the solid electrolyte layer contains: a π conjugated conductive polymer; a compound having a sulfonic group; and a water-soluble compound or a water-dispersible compound other than the compound having a sulfonic group.

(8) The capacitor according to any one of (5) to (7), in which the water-soluble compound is a water-soluble polymer compound.

(9) The capacitor according to any one of (1) to (8), in which the solid electrolyte layer further contains an alkaline compound.

(10) A method for producing a capacitor, including: a step in which a conductive polymer solution containing a π conjugated conductive polymer, a polyanion, an ion-conductive compound, and a solvent, is applied on the surface of a dielectric layer formed by oxidizing the surface of an anode made of a porous valve metal; and a step in which the conductive polymer solution applied on the surface of the dielectric layer is dried.

(11) A method for producing a capacitor including: a step in which a conductive polymer raw material solution containing precursor monomers of a π conjugated conductive polymer, a compound having a sulfonic group, a water-soluble compound or a water-dispersible compound other than the compound having a sulfonic group, and a solvent, is applied on the surface of a dielectric layer formed by oxidizing the surface of an anode made of a porous valve metal; and a step in which the precursor monomers of the π conjugated conductive polymer in the conductive polymer raw material solution applied on the surface of the dielectric layer is polymerized.

(12) A method for producing a capacitor including: a step in which a conductive polymer solution containing a π conjugated conductive polymer, a polymer having a sulfonic group, a water-soluble compound or a water-dispersible compound other than the polymer having a sulfonic group, and a solvent, is applied on the surface of a dielectric layer formed by oxidizing the surface of an anode made of a porous valve metal; and a step in which the conductive polymer solution applied on the surface of the dielectric layer is dried.

(13) The method for producing a capacitor according to any one of (10) to (12), characterized in that the pH of the conductive polymer solution at 25° C. is 3 to 13.

Effects of the Invention

The capacitor according to the present invention can be readily downsized, the ESR thereof being low, and both the electric strength and the electrostatic capacity thereof being high.

In accordance with the method for producing a capacitor according to the present invention, a capacitor with a low ESR and a high degree of electric strength can be readily prepared.

BRIEF DESCRIPTION OF THE REFERENCE SYMBOLS

| 10 | Capacitor |
|---|---|
| 11 | Anode |
| 12 | Dielectric layer |

| | |
|---|---|
| 13 | Solid electrolyte layer |
| 14 | Cathode |
| 15 | Separator |

BEST MODE FOR CARRYING OUT THE INVENTION

<Capacitor>

An aspect of a capacitor according to the present invention will be explained.

Figure 1:
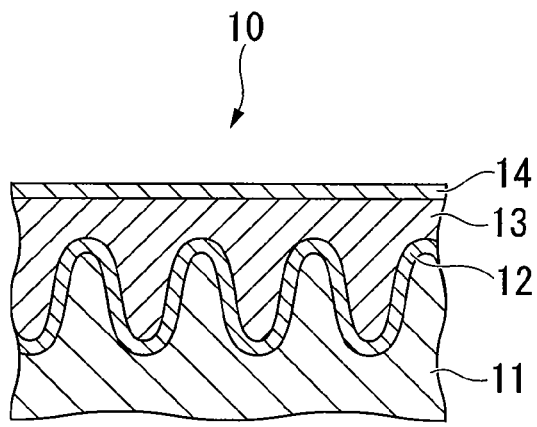
FIG. 1 is a cross-sectional view illustrating one aspect of a capacitor according to the present invention.

FIG. 1 is a drawing illustrating a structure of the capacitor of the present aspect. A capacitor 10 of the present aspect is mainly composed of an anode 11 made of a porous valve metal, a dielectric layer 12 formed by oxidizing the surface of the anode 11, a solid electrolyte layer 13 formed on the dielectric layer 12, and a cathode 14.

The surface of the anode 11 may be oxidized by performing a chemical conversion treatment. In such a case, the capacitance appearance ratio of the capacitor, calculated in accordance with the following Numerical Formula (I) is 70 to 100%, preferably 80 to 100%, and the ratio of "electric strength (V)/formation voltage (V)" thereof is 0.7 to 1.0.

Capacitance appearance ratio(%)=(electrostatic capacity($F$)/specific electrostatic capacity($F$))×100  Numerical Formula (I)

In the Numerical Formula (I), the specific electrostatic capacity means the electrostatic capacity measured using a liquid electrolyte instead of the solid electrolyte layer 13. The electric strength means the maximum voltage which does not cause insulation destruction when direct-current voltage is applied at 25° C. The formation voltage means the voltage applied to the anode 11 when the chemical conversion treatment is performed.

If the capacitance appearance ratio of the capacitor 10 is less than 70%, it is difficult to downsize the capacitor 10 while enhancing the electrostatic capacity thereof. If the ratio of "electric strength (V)/formation voltage (V)" of the capacitor 10 is less than 0.5, the efficiency of the chemical conversion treatment is low, and the formation voltage is required to be enhanced so as to realize a high degree of electric strength. Since the electric strength does not exceed the formation voltage, the ratio of "electric strength (V)/formation voltage (V)" does not exceed 1.0.

In order to make the capacitance appearance ratio and the ratio of "electric strength (V)/formation voltage (V)" fall within the above-mentioned range, a π conjugated conductive polymer, a compound having a sulfonic group, and a water-soluble compound or a water-dispersible compound other than the compound having a sulfonic group may be formulated in the solid electrolyte layer 13 as described below.

(Anode)

Examples of valve metal forming the anode 11 include aluminium, tantalum, niobium, titanium, hafnium, zirconium, zinc, tungsten, bismuth, antimony, and the like. Among them, aluminium, tantalum, or niobium is preferably used.

Specific examples of the anode 11 include one obtained by etching an aluminium foil to increase the surface area, and then the surface thereof are oxidized, and one obtained by oxidizing the surface of a sintered body of tantalum particles or niobium particles to pelletize. The surface of the anode 11 subjected to oxidization treatment in such a way is uneven.

(Dielectric Layer)

The dielectric layer 12 can be formed by oxidizing the surface of the anode 11 in an electrolytic liquid such as an aqueous solution of diammonium adipate. Therefore, the dielectric layer 12 is formed along the uneven surface of the anode 11.

If the dielectric layer 12 is formed by performing a chemical conversion treatment, the chemical conversion treatment can be performed by electrolytically oxidizing the surface of the anode 11 while applying a voltage thereto in an electrolytic liquid. At that time, the applied voltage level is suitably determined in accordance with the kind of valve metal, the surface area of the porous body, the size of the porous body, the kind of the electrolytic liquid, desired properties, or the like.

(Solid Electrolyte Layer)

The solid electrolyte layer 13 is a layer containing a π conjugated conductive polymer as an essential component thereof, and further containing both a polyanion and an ion-conductive compound or containing both a compound having a sulfonic group and either a water-soluble or water-dispersible compound. It is preferable that the thickness of the solid electrolyte layer 13 be 1 to 100 μm. When the solid electrolyte layer 13 contains the π conjugated conductive polymer, the compound having a sulfonic group, and the water-soluble or water-dispersible compound other than the compound having a sulfonic group, the capacitance appearance ratio (%) and the ratio of "electric strength (V)/formation voltage (V)" fall within the above-mentioned range.

(π Conjugated Conductive Polymer)

Any organic polymers of which the main chain is formed by a π-conjugated system may be used as the π conjugated conductive polymer. Examples thereof include polypyrroles, polythiophenes, polyacetylenes, polyphenylenes, polyphenylenevinylenes, polyanilines, polyacenes, polythiophenevinylenes, and copolymers thereof. It is preferable that the polypyrroles, polythiophenes, or polyanilines be used in terms of the ease of polymerization and the stability in the atmosphere.

Although sufficient conductivity can be realized if the π conjugated conductive polymer is not substituted, it is preferable that the π conjugated conductive polymer have an introduced functional group such as an alkyl group, a carboxylic group, a sulfonic group, an alkoxyl group, a hydroxyl group, or a cyano group, in order to further enhance the conductivity.

Examples of such a π conjugated conductive polymer include polypyrrole, poly(N-methylpyrrole), poly(3-methylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedioxythiophene), poly(3,4-propylenedioxythiophene), poly(3,4-butenedioxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-aniline sulfonate), poly(3-aniline sulfonate), and the like.

Among them, (co)polymers composed of one or two kind (s) selected from the group consisting of polypyrrole, polythiophene, poly(N-methylpyrrole), poly(3-methylthiophene), poly(3-methoxythiophene), and poly(3,4-ethylenedioxythiophene), are preferably used in terms of resistance value and reactivity. The polypyrrole and the poly(3,4-ethylenedioxythiophene) are more preferable because the thermal resistance is improved while the conductivity is further enhanced (Compound Having a Sulfonic Group)

The compound having a sulfonic group serves as a dopant of the π conjugated conductive polymer.

The compound having a sulfonic group may be a monomolecular having a sulfonic group or a polymer having a sulfonic group.

Examples of the monomolecular having a sulfonic group include organic sulfonic acid compounds, such as alkylbenzene sulfonate, alkylnaphthalene sulfonate, alkylnaphthalene disulfonate, naphthalene sulfonate-formalin polycondensate, melamine sulfonate-formalin polycondensate, naphthalene disulfonate, naphthalene trisulfonate, dinaphthylmethane disulfonate, anthraquinone sulfonate, anthraquinone disulfonate, anthracene sulfonate, pyrene sulfonate, and the like.

The polymer having a sulfonic group is a homopolymer or a copolymer selected from the group consisting of substituted or unsubstituted polyalkylenes, substituted or unsubstituted polyalkenylenes, substituted or unsubstituted polyimides, substituted or unsubstituted polyamides, and substituted or unsubstituted polyesters, and the polymer having a sulfonic group includes a unit having a sulfonic group.

(Polyanion)

The polyanion is a homopolymer or copolymer selected from the group consisting of substituted or unsubstituted polyalkylenes, substituted or unsubstituted polyalkenylenes, substituted or unsubstituted polyimides, substituted or unsubstituted polyamides, and substituted or unsubstituted polyesters, and the polyanion includes a unit having an anion group. The polyanion may also include a unit free from any anion groups, as needed.

Both the polymer having a sulfonic group and the polyanion not only contribute to dissolving the π conjugated conductive polymer in a solvent, but also serve as dopants of the π conjugated conductive polymer.

The polyalkylene is a polymer of which the main chain is constructed by repeated methylene units. Examples thereof include polyethylene, polypropylene, polybutene, polypentene, polyhexene, polyvinyl alcohol, polyvinylphenol, poly(3,3,3-trifluoropropylene), polyacrylonitrile, polyacrylate, polystyrene, and the like.

The polyalkenylene is a polymer constructed by units of which the main chain has at least one unsaturated linkage (vinyl group). Among them, substituted or unsubstituted butenylenes are preferable, because the unsaturated linkages thereof can interact with the π conjugated conductive polymer, and the substituted or unsubstituted butenylenes can be easily synthesized using a substituted or unsubstituted butadiene as a starting substance.

Examples of the polyalkenylene include polymers having at least one unit selected from the group consisting of propenylene, 1-methylpropenylene, 1-butylpropenylene, 1-decylpropenylene, 1-cyanopropenylene, 1-phenylpropenylene, 1-hydroxypropenylene, 1-butenylene, 1-methyl-1-butenylene, 1-ethyl-1-butenylene, 1-octyl-1-butenylene, 1-pentadecyl-1-butenylene, 2-methyl-1-butenylene, 2-ethyl-1-butenylene, 2-butyl-1-butenylene, 2-hexyl-1-butenylene, 2-octyl-1-butenylene, 2-decyl-1-butenylene, 2-dodecyl-1-butenylene, 2-phenyl-1-butenylene, 2-butenylene, 1-methyl-2-butenylene, 1-ethyl-2-butenylene, 1-octyl-2-butenylene, 1-pentadecyl-2-butenylene, 2-methyl-2-butenylene, 2-ethyl-2-butenylene, 2-butyl-2-butenylene, 2-hexyl-2-butenylene, 2-octyl-2-butenylene, 2-decyl-2-butenylene, 2-dodecyl-2-butenylene, 2-phenyl-2-butenylene, 2-propylenephenyl-2-butenylene, 3-methyl-2-butenylene, 3-ethyl-2-butenylene, 3-butyl-2-butenylene, 3-hexyl-2-butenylene, 3-octyl-2-butenylene, 3-decyl-2-butenylene, 3-dodecyl-2-butenylene, 3-phenyl-2-butenylene, 3-propylenephenyl-2-butenylene, 2-pentenylene, 4-propyl-2-pentenylene, 4-butyl-2-pentenylene, 4-hexyl-2-pentenylene, 4-cyano-2-pentenylene, 3-methyl-2-pentenylene, 4-ethyl-2-pentenylene, 3-phenyl-2-pentenylene, 4-hydroxy-2-pentenylene, hexenylene, and the like.

Examples of the polyimide include polyimides obtained using anhydrides such as pyromellitic dianhydrides, biphenyltetracarboxylic dianhydrides, benzophenone tetracarboxylic dianhydrides, 2,2',3,3'-tetracarboxy diphenylether dianhydrides, or 2,2'-[4,4'-di(dicarboxyphenyloxy)phenyl] propane dianhydrides, together with diamines such as oxydiamines, paraphenylene diamines, metaphenylene diamines, or benzophenone diamines.

Examples of the polyamide include polyamide 6, polyamide 6,6, polyamide 6, 10, and the like.

Examples of the polyester include polyethylene terephthalates, polybutylene terephthalate, and the like.

If the polyanion has another substituent, examples of the other substituent include alkyl groups, a hydroxyl group, an amino group, a cyano group, a phenyl group, a phenol group, ester groups, alkoxyl groups, a carbonyl groups, and the like. The alkyl groups, hydroxyl group, phenol group, and ester groups, are preferable in view of their solubility in a solvent, their thermal resistance, their compatibility in resin, and the like.

If the polymer having a sulfonic group has another substituent, examples of the substituent include alkyl groups, a hydroxyl group, an amino group, a cyano group, a phenyl group, a phenol group, alkoxyl groups, a carbonyl group, oxycarbonyl groups, and the like. The alkyl groups, hydroxyl group, phenol group, and oxycarbonyl groups are preferable in view of their solubility in solvent, their thermal resistance, their compatibility in resin, and the like.

The alkyl groups contribute to increasing the solubility and dispersibility in a polar solvent or a nonpolar solvent, and increasing the compatibility and the dispersibility in resin. The hydroxyl group contributes to promoting the formation of hydrogen bonding with another hydrogen atom, or the like, and increasing the solubility in an organic solvent, the compatibility in resin, the dispersibility therein, and the adhesive properties. The cyano group and the hydroxyphenyl group contribute to increasing in the compatibility and the solubility in polar resin, and the thermal resistance.

Among the above-mentioned substituents, the alkyl groups, hydroxyl group, ester groups, oxycarbonyl groups, and cyano group are preferable.

Examples of the alkyl groups include chain alkyl groups such as methyl, ethyl, propyl, butyl, isobutyl, t-butyl, pentyl, hexyl, octyl, decyl, and dodecyl, and cycloalkyl groups such as cyclopropyl, cyclopentyl, and, cyclohexyl. Alkyl groups having 1 to 12 carbon atoms are more preferable in view of their solubility in an organic solvent, the dispersibility in resin, steric hindrance, and the like.

The hydroxyl group may be a hydroxyl group directly bonding to the main chain of the polyanion or the polymer having a sulfonic group, or a hydroxyl group bonding to the main chain via another functional group. Examples of the another functional group include alkyl groups having 1 to 7 carbon atoms, alkenyl groups having 2 to 7 carbon atoms, amido groups, imido groups, and the like. The hydroxyl group is substituted in such a functional group at an end portion or inside portion thereof. It is more preferable that the hydroxyl group bond to an end portion of any one of the alkyl groups having 1 to 6 carbon atoms linking to the main chain in view of the compatibility in resin, and the solubility in an organic solvent.

Examples of the ester groups include alkyl-based ester groups and aromatic ester groups, the alkyl-based ester groups and the aromatic ester groups directly bonding to the main chain of the polyanion, or bonding to the main chain via another functional group.

Examples of the oxycarbonyl groups include alkyloxycarbonyl groups and aryl oxycarbonyl groups, the alkyloxycarbonyl groups and the aryl oxycarbonyl groups directly bonding to the main chain of the polymer having a sulfonic group, or bonding to the main chain via another functional group.

The cyano group may be a cyano group directly bonding to the main chain of the polyanion or the polymer having a sulfonic group; a cyano group bonding to an end portion of any one of alkyl groups having 1 to 7 carbon atoms, the alkyl group bonding to the main chain of the polyanion or the polymer having a sulfonic group; a cyano group bonding to an end portion of any one of alkenyl group having 2 to 7 carbon atoms, the alkenyl group bonding to the main chain of the polyanion or the polymer having a sulfonic group; or the like.

The anion group of the polyanion may be any one of functional groups which can cause chemical oxidation doping in the π conjugated conductive polymer. Among them, monosubstituted sulfuric ester groups, monosubstituted phosphoric ester groups, a phosphate group, a carboxyl group, a sulfo group, and the like, are preferable in terms of their ease of production and their stability. The sulfo group, monosubstituted sulfuric ester groups, and the carboxyl group are more preferable from the standpoint of doping effects of the functional groups in the π conjugated conductive polymer.

Specific examples of the polyanion include polyvinyl sulfonates, polystyrene sulfonates, polyaryl sulfonates, polyethyl acrylate sulfonates, polybutyl acrylate sulfonates, polyacrylate sulfonates, polymethacrylate sulfonates, poly(2-acrylamide-2-methylpropane sulfonates), polyisoprene sulfonates, polyvinyl carboxylates, polystyrene carboxylates, polyaryl carboxylates, poly(2-acrylamide-2-methylpropane carboxylates), polyisoprene carboxylates, polyacrylates, and the like. The polyanion may be a homopolymer thereof or a copolymer of at least two kinds thereof.

Among them, the polystyrene sulfonates, polyisoprene sulfonates, polyethyl acrylate sulfonates, and polybutyl acrylate sulfonates are preferable. These polyanions can suppress the thermal decomposition of the π conjugated conductive polymer.

Examples of the polymer having a sulfonic group include polyvinyl sulfonates, polystyrene sulfonates, polyaryl sulfonates, polyethyl acrylate sulfonates, polybutyl acrylate sulfonates, poly(2-acrylamide-2-methylpropane sulfonates), polyisoprene sulfonates, and the like. The polymer may be a homopolymer thereof, or a copolymer of at least two kinds thereof.

Among them, the polystyrene sulfonates, polyisoprene sulfonates, polyethyl acrylate sulfonates, and polybutyl acrylate sulfonates are preferable. These polymers can suppress the thermal decomposition of the π conjugated conductive polymer.

The polymerization degree of monomer unit in each the polyanion and the polymer having a sulfonic group is preferably within the range of 10 to 100,000, and more preferably within the range of 50 to 10,000, in terms of the solvent solubility and conductivity.

It is preferable that the content of the π conjugated conductive polymer in the solid electrolyte layer 13 based on 100 parts by mass of the polyanion or the polymer having a sulfonic group be 1 to 1,000 parts by mass. If the content of π conjugated conductive polymer is less than 1 part by mass, the conductivity tends to be insufficient. If the content of π conjugated conductive polymer exceeds 1,000 parts by mass, the solvent solubility tends to be insufficient.

(Ion-Conductive Compound)

The ion-conductive compound used according to the present invention is a polymer having repeating units with an electron donating portion (nucleophilic portion) and exhibiting an ion-conductivity in the presence of an electrolyte. Examples of the electron donating portion include a cyano group, an amino group, an amido group, and an imido group. In addition, an amide linkage (—NH—CO—) and an ether linkage (—O—) serve as the electron donating portions.

The ion-conductive compound is preferably a compound having in the molecule thereof a structure represented by the following Chemical Formula (I), because the electric strength of the capacitor 10 is further enhanced. The structure represented by Chemical Formula (I) may exist in the main chain of the compound, or in the side chain thereof. In addition, the structure may plurally exist in the compound.

In Chemical Formula (I), R represents at least one selected from the group consisting of substituted or unsubstituted alkylenes, substituted or unsubstituted alkenylenes, and substituted or unsubstituted phenylenes.

Examples of the substituted or unsubstituted alkylenes as R include ethylene, propylene, butylene, and the like.

Examples of the substituted or unsubstituted alkenylenes include propenylene, 1-methyl-propenylene, 1-butyl-propenylene, 1-decyl-propenylene, 1-cyano-propenylene, 1-phenyl-propenylene, 1-hydroxy-propenylene, 1-butenylene, and the like.

n represents an integer of 1 to 2,000, preferably an integer of 3 to 1,000. If n exceeds 2,000, the compatibility of the ion-conductive compound with the π conjugated conductive polymer tends to decrease, and the formation of a uniform matrix tends to be difficult.

The ion-conductive compound is preferably a compound represented by the following Chemical Formula (II), because the electric strength of the capacitor 10 is particularly enhanced.

In Chemical Formula (II), R represents at least one selected from the group consisting of the substituted or unsubstituted alkylenes, the substituted or unsubstituted alkenylenes, and the substituted or unsubstituted phenylenes. The alkylene and the alkenylene are the same as those of Chemical Formula (I).

X represents at least one selected from the group consisting of a hydrogen atom, a hydroxyl group, substituted or unsubstituted alkyl groups, substituted or unsubstituted alkoxyl groups, substituted or unsubstituted alkenyl groups, substituted or unsubstituted aryl groups, substituted or unsubstituted glycidyl groups, substituted or unsubstituted (meth)acryloyl groups, and substituted or unsubstituted oxycarbonyl groups.

Y represents at least one selected from the group consisting of a hydrogen atom, substituted or unsubstituted alkyl groups, substituted or unsubstituted alkenyl groups, substituted or unsubstituted aryl groups, substituted or unsubstituted glycidyl groups, substituted or unsubstituted (meth)acryloyl groups, and substituted or unsubstituted carbonyl groups.

In the case where X or Y is substituted with a substituent, examples thereof include alkyl groups, a hydroxyl group, a vinyl group, alkylaryl groups, an acryloyl group, an amino group, amido groups, and the like.

Examples of the substituted or unsubstituted alkylenes as R include ethylene, propylene, butylene, and the like.

Examples of the substituted or unsubstituted alkenylenes include propenylenes, 1-methyl-propenylene, 1-butyl-propenylene, 1-decyl-propenylene, 1-cyano-propenylene, 1-phenyl-propenylene, 1-hydroxy-propenylene, 1-butenylene, and the like.

Examples of the alkyl groups as X include a methyl group, an ethyl group, a propyl group, a butyl group, and the like.

Examples of the alkoxy groups include a methoxy group, an ethoxy group, a propoxy group, a butoxy group, and the like.

Examples of the alkenyl groups include a propenyl group, a butenyl group, and the like.

Examples of the aryl groups include a phenyl group, a naphthyl group, and the like.

Examples of the polymer represented by Chemical Formula (I) or Chemical Formula (II) include: monofunctional (meth)acrylate compounds, such as, diethylene glycol, triethylene glycol, oligo/polyethylene glycol, triethylene glycol monochlorohydrin, diethylene glycol monochlorohydrin, oligo ethylene glycol monochlorohydrin, triethylene glycol monobromohydrin, diethylene glycol monobromohydrin, oligo ethylene glycol monobromohydrin, polyethylene glycol, polyether, polyethylene oxide, triethylene glycol-dimethylether, tetraethylene glycol-dimethylether, diethylene glycol-dimethylether, diethylene glycol-diethylether-diethylene glycol-dibutylether, dipropylene glycol, tripropylene glycol, polypropylene glycol, polypropylene dioxide, polyoxyethylene alkylether, polyoxyethylene glycerin fatty acid ester, polyoxyethylene fatty acid amide, 2-hydroxyethyl methacrylate, 2-hydroxypropyl methacrylate, n-butoxyethyl methacrylate, n-butoxyethylene glycol methacrylate, methoxytriethylene glycol methacrylate, methoxypolyethylene glycol methacrylate, 2-hydroxyethyl acrylate, 2-hydroxypropyl acrylate, n-butoxyethyl acrylate, n-butoxyethylene glycol acrylate, methoxytriethylene glycol acrylate, methoxypolyethylene glycol acrylate, and the like; bifunctional (meth)acrylate compounds, such as, ethylene glycol di(meth)acrylate, diethylene glycol di(meth)acrylate, triethylene glycol di(meth)acrylate, polyethylene glycol di(meth)acrylate, neopentyl glycol di(meth)acrylate, glycerin di(meth)acrylate, and the like; glycidyl ethers, such as, ethylene glycol diglycidyl ether, glycidyl ether, diethylene glycol diglycidyl ether, triethylene glycol diglycidyl ether, polyethylene glycol diglycidyl ether, propylene glycidyl ether, tripropylene glycidyl ether, polypropylene glycidyl ether, glycerin diglycidyl ether, and the like; glycidyl methacrylate, trimethylolpropane triacrylate, ethylene oxide-modified trimethylolpropane triacrylate, ethylene oxide-modified pentaerythritol triacrylate, ethylene oxide-modified pentaerythritol tetraacrylate, and the like.

Examples of the ion-conductive compound other than the polymers represented by Chemical Formula (I) or Chemical Formula (II) include polyvinylpyrrolidone constructed by monomer units having an amide linkage, polyacrylamide constructed by monomer units having an amido group, polyvinyl acetamide, polyamide, polyimide, polyamic acid, polyacrylonitrile, polysilamine, polyvinyl alcohol, and the like.

The ion-conductive compound may be cross-linked, as needed. The method for cross-linking is not particularly limited, and well known methods may be adopted. For example, if the ion-conductive compound has (meth)acryloyl groups, the (meth)acryloyls are reacted to be cross-linked using a radical generator, such as, an azo-based compound, peroxide, or the like.

It is preferable that the content of the ion-conductive compound based on 100 parts by mass of the total mass of the $\pi$ conjugated conductive polymer and the polyanion be 1 to 10,000 parts by mass, more preferably 50 to 1,500 parts by mass. If the content of the ion-conductive compound is less than 1 part by mass, the electric strength of the capacitor 10 may not be enhanced. If the content exceeds 10,000 parts by mass, the conductivity of the solid electrolyte layer 13 tends to be low, and the ESR of the capacitor 10 tends to be high.

(Conductive-Enhancer)

It is preferable that the solid electrolyte layer 13 further contain a conductive-enhancer, because the conductive-enhancer contributes to enhancing the conductivity. The conductive-enhancer is one which can interact with the $\pi$ conjugated conductive polymer or the dopant of the $\pi$ conjugated conductive polymer to enhance an electrical conductivity of the $\pi$ conjugated conductive polymer.

It is preferable that the conductive-enhancer be at least one compound selected from the group consisting of nitrogen-containing aromatic cyclic compounds, compounds having at least two hydroxyl groups, compounds having at least two carboxyl groups, compounds having at least one hydroxyl group and at least one carboxyl group, compounds having an amido group, compound having an imido group, lactam compounds, and compounds having a glycidyl group, because the conductivity of the solid electrolyte layer 13 is further improved.

(Water-Soluble Compound)

The water-soluble compound is a compound other than the compounds having a sulfonic group exemplified in the paragraph 0014, the compound being a liquid or solid at normal temperature under ordinary pressure, and at least 0.5 g of the compound being able to dissolve in 100 g of water. Examples of the water-soluble compound include compounds having a hydrophilic group including an atom which strongly interacts with water, such as, oxygen, nitrogen, sulfur, or the like. Examples of the hydrophilic group include —CO—, —COOM, —CONR—, —OH, —NR$_2$, —O—, —SO$_3$M, and salts including such a group (R is a hydrogen atom or an organic group; and M is a hydrogen atom, alkali metal, alkaline-earth metal, quaternary amine, or the like). The compounds having a —SO$_3$M group, used as the water-soluble compound, are distinguished from those added to the $\pi$ conjugated conductive polymer as a dopant.

The water-soluble compound may be a water-soluble monomolecular compound or a water-soluble polymer compound.

Water-Soluble Monomolecular Compound

Examples of the water-soluble monomolecular compound include nitrogen-containing aromatic cyclic compounds, compounds having at least two hydroxyl groups, compounds having at least two carboxyl groups, compounds having at least one hydroxyl group and at least one carboxyl group, compounds having an amido group, compounds having an imido group, lactam compounds, compounds having a glycidyl group, silane couplers, acrylic compounds, water-soluble organic solvents, and the like.

Nitrogen-Containing Aromatic Cyclic Compound

The nitrogen-containing aromatic cyclic compound is a compound having an aromatic ring having at least one nitrogen atom, and the nitrogen atom in the aromatic ring is in a conjugate relation with another atom in the aromatic ring. The nitrogen atom forms an unsaturated linkage with the another atom for the conjugate relation. Alternatively, the nitrogen atom may be adjacent to another atom forming the unsaturated linkage, even if the nitrogen atom does not directly form an unsaturated linkage with another atom. In such a case, an unshared electron pair existing on the nitrogen atom can be in the pseudo-conjugate relation with the unsaturated linkage formed between other atoms.

It is preferable that the nitrogen-containing aromatic cyclic compound have both a nitrogen atom being in the conjugate relation with another atom and a nitrogen atom being adjacent to another atom forming an unsaturated linkage.

Examples of such a nitrogen-containing aromatic cyclic compound include pyridines having at least one nitrogen atom and derivatives thereof, imidazoles having at least two nitrogen atoms and derivatives thereof, pyrimidines and derivatives thereof, pyrazines and derivatives thereof, triazines having three nitrogen atoms and derivatives thereof, and the like. The pyridines and derivatives thereof, imidazoles and derivatives thereof and pyrimidines and derivatives thereof, are preferable in terms of the solvent solubility or the like.

The nitrogen-containing aromatic cyclic compound may be either one having a substituent, such as an alkyl group, a hydroxyl group, a carboxyl group, a cyano group, a phenyl group, a phenol group, an ester group, an oxycarbonyl group, an alkoxyl group, a carbonyl group, or the like, the substituent being introduced into the ring thereof, or one free from any substituents. The ring may be polycyclic.

Specific examples of the pyridines and the derivatives thereof include pyridine, 2-methylpyridine, 3-methylpyridine, 4-methylpyridine, 4-ethylpyridine, N-vinylpyridine, 2,4-dimethylpyridine, 2,4,6-trimethylpyridine, 3-cyano-5-methylpyridine, 2-pyridine carboxylate, 6-methyl-2-pyridine carboxylate, 4-pyridine carboxy aldehyde, 4-aminopyridine, 2,3-diaminopyridine, 2,6-diaminopyridine, 2,6-diamino-4-methylpyridine, 4-hydroxypyridine, 4-pyridine methanol, 2,6-dihydroxypyridine, 2,6-pyridine dimethanol, 6-hydroxy methyl nicotinate, 2-hydroxy-5-pyridine methanol, 6-hydroxy ethyl nicotinate, 4-pyridine methanol, 4-pyridine ethanol, 2-phenylpyridine, 3-methylquinoline, 3-ethylquinoline, quinolinol, 2,3-cyclopentenopyridine, 2,3-cyclohexanopyridine, 1,2,-di(4-pyridyl)ethane, 1,2-di(4-pyridyl)propane, 2-pyridine carboxy aldehyde, 2-pyridine carboxylate, 2-pyridine carbonitrile, 2,3-pyridine dicarboxylate, 2,4-pyridine dicarboxylate, 2,5-pyridine dicarboxylate, 2,6-pyridine dicarboxylate, 3-pyridine sulfonate, and the like.

Specific examples of the imidazoles and the derivatives thereof include imidazole, 2-methylimidazole, 2-propylimidazole, 2-undecylimidazole, 2-phenylimidazole, N-methylimidazole, N-vinylimidazole, N-aryl imidazole, 1-(2-hydroxyethyl)imidazole, (N-hydroxyethylimidazole), 2-ethyl-4-methylimidazole, 1,2-dimethylimidazole, 1-benzil-2-methylimidazole, 1-benzil-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazole dicarboxylate, dimethyl 4,5-imidazole dicarboxylate, benzimidazole, 2-aminobenzimidazole, 2-aminobenzimidazole-2-sulfonate, 2-amino-1-methylbenzimidazole, 2-hydroxybenzimidazole, 2-(2-pyridyl)benzimidazole, and the like.

Specific examples of the pyrimidines and the derivatives thereof include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylate, 2,4,6-triaminopyrimidine, 2,4-dimethoxypyrimidine, 2,4,5-trihydroxypyrimidine, 2,4-pyrimidinediol, and the like.

Specific examples of the pyrazines and the derivatives thereof include pyrazine, 2-methylpyrazine, 2,5-dimethylpyrazine, pyrazine carboxylate, 2,3-pyrazine dicarboxylate, 5-methylpyrazine carboxylate, pyrazineamide, 5-methylpyrazineamide, 2-cyanopyrazine, aminopyrazine, 3-aminopyrazine-2-carboxylate, 2-ethyl-3-methylpyrazine, 2-ethyl-3-methylpyrazine, 2,3-dimethylpyrazine, 2,3-diethylpyrazine, and the like.

Specific examples of the triazines and the derivatives thereof include 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluoromethyl)-1,3,5-triazine, 2,4,6-tri-2-pyridine-1,3,5-triazine, disodium 3-(2-pyridine)-5,6-bis(4-phenyl sulfonate)-1,2,4-triazine, 3-(2-pyridine)-5,6-diphenyl-1,2,4-triazine, disodium 3-(2-pyridine)-5,6-diphenyl-1,2,4-triazine-ρ,ρ'-disulfonate, 2-hydroxy-4,6-dichloro-1,3,5-triazine, and the like.

Since an unshared electron pair exists on a nitrogen atom of the nitrogen-containing aromatic cyclic compound, a substituent or a proton is easily coordinated in or bonded to the nitrogen atom. In the case where the substituent or the proton is coordinated in or bonded to the nitrogen atom, the nitrogen atom tends to be charged with a cationic charge. Since the nitrogen atom is in the conjugate relation with another atom, the cationic charge generated by coordination or bonding of the substituent or the proton on the nitrogen atom is diffused in the aromatic ring having the nitrogen atom, to be in a stable form.

Thus, the nitrogen-containing aromatic cyclic compound may form a nitrogen-containing aromatic cyclic compound cation in which a substituent is introduced into a nitrogen atom thereof. In addition, the cation may be combined with an anion to form a salt. Even in this case, similar effects to those of the nitrogen-containing aromatic cyclic compound, which is not a cation, are exhibited.

Examples of the substituent which may be introduced into a nitrogen atom of the nitrogen-containing aromatic cyclic compound include a hydrogen atom, an alkyl group, a hydroxyl group, a carboxyl group, a cyano group, a phenyl group, a phenol group, an ester group, an oxycarbonyl group, an alkoxyl group, a carbonyl group, and the like. The above-mentioned substituent may be introduced.

It is preferable that the content of the nitrogen-containing aromatic cyclic compound per mol of an anion group unit of the polyanion be within the range of 0.1 to 100 moles, more preferably 0.5 to 30 moles. Even more preferably, the content is within the range of 1 to 10 moles, from the standpoint of physical properties and conductivity of the solid electrolyte layer 13. If the content of the nitrogen-containing aromatic cyclic compound is less than 0.1 moles, the interaction between the nitrogen-containing aromatic cyclic compound and the polyanion or between the nitrogen-containing aromatic cyclic compound and the conjugated conductive polymer tends to decrease, and there is a case where the obtained conductivity is not sufficient. If the content of the nitrogen-containing aromatic cyclic compound exceeds 100 moles, the content of the conjugated conductive polymer decreases, the provision of sufficient conductivity tends to be difficult, and the physical properties of the solid electrolyte layer 13 may vary.

Compounds Having at Least Two Hydroxyl Groups

Examples of the compounds having at least two hydroxyl groups include: polyhydric aliphatic alcohols, such as, propylene glycol, 1,3-butylene glycol, 1,4-butylene glycol, glycerin, diglycerin, D-glucose, D-glucitol, isoprene glycol, dimethylol propionate, butanediol, 1,5-pentanediol, 1,6-hexanediol, 1,9-nonanediol, neopentyl glycol, trimethylol ethane, trimethylol propane, pentaerythritol, dipentaerythritol, thiodiethanol, glucose, tartaric acid, D-glucaric acid, glutaconic acid, and the like;

polymer alcohols, such as, polyvinyl alcohol, cellulose, polysaccharide, sugar alcohol, and the like; and aromatic compounds, such as, 1,4-dihydroxybenzene, 1,3-dihydroxybenzene, 2,3,-dihydroxy-1-pentadecylbenzene, 2,4-dihydroxy acetophenone, 2,5-dihydroxy acetophenone, 2,4-dihydroxy benzophenone, 2,6-dihydroxy benzophenone, 3,4-dihydroxy benzophenone, 3,5-dihydroxy benzophenone, 2,4-dihydroxy diphenylsulfone, 2,2', 5,5'-tetrahydroxy diphenylsulfone, 3,3',5,5'-tetramethyl-4,4'-dihydroxy diphenylsulfone, hydroxy quinone carboxylate and salts thereof, 2,3-dihydroxy benzoic acid, 2,4-dihydroxy benzoic acid, 2,5-dihydroxy benzoic acid, 2,6-dihydroxy benzoic acid, 3,5-dihydroxy benzoic acid, 1,4-hydroquinone sulfonate and salts thereof, 4,5-hydroxybenzene-1,3-disulfonate and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylate, 1,6-dihydroxynaphthalene-2,5-dicarboxylate, 1,5-dihydroxy naphthoic acid, 1,4-dihydroxy-2-naphthoic acid phenylester, 4,5-dihydroxynaphthalene-2,7-disulfonate and salts thereof, 1,8-dihydroxy-3,6-naphthalene disulfonate and salts thereof, 6,7-dihydroxy-2-naphthalene sulfonate and salts thereof, 1,2,3-trihydroxybenzene (pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxy benzoic acid, trihydroxy acetophenone, trihydroxybenzophenone, trihydroxybenzo aldehyde, trihydroxyanthraquinone, 2,4,6-trihydroxybenzene, tetrahydroxy-p-benzo quinone, tetrahydroxyanthraquinone, methyl gallate, ethyl gallate, potassium hydroquinone sulfonate, and the like.

It is preferable that the content of the compounds having at least two hydroxyl groups be within the range of 0.05 to 50 moles, more preferably 0.3 to 10 moles, per mole of an anion group unit of the polyanion. If the content of the compounds having at least two hydroxyl groups based on 1 mole of an anion group unit of the polyanion is less than 0.05 moles, the conductivity of the thermal resistance may be insufficient. If the content of the compounds having at least two hydroxyl groups is more than 50 moles per mole of an anion group unit of the polyanion, the content of the π conjugated conductive polymer in the solid electrolyte layer 13 decreases, the provision of sufficient conductivity may be difficult, and a change in the physical properties of the solid electrolyte layer 13 may occur.

The conductivity of the solid electrolyte layer 13 can be further enhanced by formulating a compound having at least two hydroxyl groups as a conductive-enhancer, because of the following reasons.

The π conjugated conductive polymer in the solid electrolyte layer 13 is highly oxidized, and a portion thereof is to be easily oxidized and deteriorated by heat or the like. Accordingly, it is presumed that radicals generate and deterioration proceeds by radical chain reaction. In contrast, it is assumed that the hydroxyl groups of the compound having at least two hydroxyl groups capture radicals, and thereby the radical chain reaction is intercepted and the proceeding of the deterioration is inhibited, as a result of which the conductivity is further enhanced.

Compounds Having at Least Two Carboxyl Groups

Examples of the compounds having at least two carboxyl groups include:

aliphatic carboxylate compounds, such as, maleic acid, fumaric acid, itaconic acid, citraconic acid, malonic acid, 1,4-butane dicarboxylate, succinic acid, tartaric acid, adipic acid, D-glucaric acid, glutaconic acid, citric acid, and the like;

aromatic carboxylate compounds in which at least one carboxyl group is bonded to the aromatic ring thereof, such as, phthalic acid, terephthalic acid, isophthalic acid, tetrahydrophthalic anhydride, 5-sulfoisophthalic acid, 5-hydroxyisophthalic acid, methyltetrahydrophthalic anhydride, 4,4'-oxydiphthalic acid, biphenyltetracarboxylic dianhydrides, benzophenone tetracarboxylic dianhydrides, naphthalene dicarboxylate, trimellitic acid, pyromellitic acid, and the like;

diglycolic acid, oxydibutyric acid, thiodiacetic acid, thiodibutyric acid, iminodi acetic acid, iminobutyric acid, and the like.

It is preferable that the content of the compound having at least two carboxyl groups based on 1 mole of an anion group unit of the polyanion be within the range of 0.1 to 30 moles, and more preferably 0.3 to 10 moles. If the content of the compound having at least two carboxyl groups based on 1 mole of an anion group unit of the polyanion is less than 0.1 moles, the conductivity or the thermal resistance may be insufficient. If the content of the compound having at least two carboxyl groups based on 1 mole of an anion group unit of the polyanion is more than 30 moles, the content of the π conjugated conductive polymer in the solid electrolyte layer 13 decreases, the provision of sufficient conductivity may be difficult, and a change in the physical properties of the solid electrolyte layer 13 may occur.

Compounds Having at Least One Hydroxyl Group and at Least One Carboxyl Group

Examples of the compounds having at least one hydroxyl group and at least one carboxyl group include tartaric acid, glyceric acid, dimethylol butanoic acid, dimethylol propanoic acid, D-glucaric acid, glutaconic acid, and the like.

It is preferable that the content of the compound having at least one hydroxyl group and at least one carboxyl group based on 100 parts by mass of the total mass of the polyanion and the π conjugated conductive polymer be 1 to 5,000 parts by mass, more preferably 50 to 500 parts by mass. If the content of the compound having at least one hydroxyl group and at least one carboxyl group is less than 1 part by mass, the conductivity and the thermal resistance may be insufficient. If the content of the compound having at least one hydroxyl group and at least one carboxyl group is more than 5,000 parts by mass, the content of the π conjugated conductive polymer in the solid electrolyte layer 13 decreases, and the provision of sufficient conductivity may be difficult.

Amide Compound

The compounds having an amido group are monomolecular compounds having in the molecule thereof an amide linkage represented by "—CO—NH-" (in which a portion "CO" contains a double bond). Examples of the amide compounds include compounds having functional groups at both end portions of the above linkage, compounds in which a cyclic compound is bonded to one end portion of the above linkage, urea and urea derivatives of which functional groups at both end portions of the above linkage are hydrogen atoms, and the like.

Specific examples of the amide compounds include acetamide, malonamide, succinamide, maleamide, fumaramide, benzamide, naphthoamide, phthalamide, isophthalamide, terephthalamide, nicotinamide, isonicotinamide, 2-furamide, formamide, N-methylformamide, propionamide, propiolamide, butylamide, isobutylamide, methacrylamide, palmitamide, stearyl amide, oleamide, oxamide, glutaramide, adipamide, cinnamamide, glycolamide, lactamide, glyceramide, tartaramide, citramide, glyoxylamide, acetoacetamide, dimethyl acetamide, benzilamide, anthranilamide, ethylenediamine tetraacetamide, diacetamide, triacetamide, dibenzamide, tirbenzamide, rhodanine, urea, 1-acetyl-2-thiourea, biuret, butylurea, dibutylurea, 1,3-dimethylurea, 1,3-diethylurea, derivative thereof, and the like.

In addition, acrylamide may be used as an amide compound. Examples of the acrylamide include N-methylacrylamide, N-methylmethacrylamide, N-ethylacrylamide, N-ethylmethacrylamide, N,N-dimethylacrylamide, N,N-dimethylmethacrylamide, N,N-diethylacrylamide, N,N-diethylmeth acrylamide, 2-hydroxyethyl acrylamide, 2-hydroxyethyl methacrylamide, N-methylol acrylamide, N-methylol methacrylamide, and the like.

It is preferable that the molecular weight of the amide compound be 46 to 10,000, more preferably 46 to 5,000, and even more preferably 46 to 1,000.

It is preferable that the content of the amide compound based on 100 parts by mass of the total mass of the polyanion and the π conjugated conductive polymer be 1 to 5,000 parts by mass, and more preferably 50 to 500 parts by mass. If the content of the amide compound is less than 1 part by mass, the conductivity and the thermal resistance may be insufficient. If the content of the amide compound is more than 5,000 parts by mass, the content of the π conjugated conductive polymer in the solid electrolyte layer 13 decreases, and the provision of sufficient conductivity may be difficult.

Imide compound

It is preferable that the imide compound be a monomolecular compound having an imide linkage (hereinafter, abbreviated as "imide compound"), because the conductivity is further enhanced. As the imide compound, in view of the structure thereof, phthalimide and phthalimide derivatives, succinimide and succinimide derivatives, benzimide and benzimide derivatives, maleimide and maleimide derivatives, naphthalimide and naphthalimide derivatives, and the like, are exemplified.

Although the imide compounds are classified into aliphatic imides, aromatic imides, and the like, depending on the kind of functional groups at both ends thereof, the aliphatic imides are preferable in terms of the solubility.

In addition, the aliphatic imide compounds are classified into saturated aliphatic imide compounds without having any unsaturated linkages between carbon atoms in the molecule and unsaturated aliphatic imide compounds having an unsaturated linkage between carbon atoms in the molecule.

The saturated aliphatic imide compound is a compound represented by "$R^1$—CO—NH—CO—$R^2$", in which both $R^1$ and $R^2$ are saturated hydrocarbons. Specific examples thereof include cyclohexane-1,2-dicarboxy imide, allantoin, hydantoin, barbituric acid, alloxan, glutarimide, succinimide, 5-butylhydantoic acid, 5,5-dimethylhydantoin, 1-methylhydantoin, 1,5,5-trimethylhydantoin, 5-hydantoinacetic acid, N-hydroxy-5-norbornene-2,3-dicarboxy imide, glutarimide, semicarbazide, α,α-dimethyl-6-methylsuccinimide, bis[2-(succinimide oxycarbonyloxy)ethyl]sulfone, α-methyl-α-propylsuccinimide, cyclohexylimide, and the like.

The unsaturated aliphatic imide compound is a compound represented by "$R^1$—CO—NH—CO—$R^2$", in which at least one of $R^1$ and $R^2$ is at least one unsaturated linkage. Specific examples thereof include 1,3-dipropyleneurea, maleimide, N-methylmaleimide, N-ethylmaleimide, N-hydroxymaleimide, 1,4-bismaleimide butane, 1,6-bismaleimide hexane, 1,8-bismaleimide octane, N-carboxyheptylmaleimide, and the like.

It is preferable that the molecular weight of the imide compound be 60 to 5,000, more preferably 70 to 1,000, and even more preferably 80 to 500.

It is preferable that the content of the imide compound based on 100 parts by mass of the total mass of the π conjugated conductive polymer and the polyanion be 10 to 10,000 parts by mass, more preferably 50 to 5,000 parts by mass. If the contents of the amide compound and the imide compound are less than the above-mentioned lower limits, effects of addition of the amide compound and the imide compound may deteriorate, which is not favorable. If the contents are more than the above-mentioned upper limits, the decrease in the conductivity due to the decrease of the concentration of the π conjugated conductive polymer may occur, which is not favorable.

Lactam Compound

The lactam compound is an intramolecular cyclic amide of aminocarboxylate, in which the ring has a portion represented by "—CO—NR—" (in which R is hydrogen or an arbitrary substituent). At least one carbon atom of the ring may be substituted with an unsaturated bond or a hetero atom.

Examples of the lactam compound include pentano-4-lactam, 4-pentanolactam-5-methyl-2-pyrrolidone, 5-methyl-2-pyrrolidinone, hexano-6-lactam, 6-hexanelactam, and the like.

It is preferable that the content of the lactam compound based on 100 parts by mass of the total mass of the π conjugated conductive polymer and the polyanion be 10 to 10000 parts by mass, more preferably 50 to 5000 parts by mass. If the content of the lactam compound is less than the above-mentioned lower limit, effects of addition of the lactam compound may deteriorate, which is not favorable. If the content of the lactam compound is more than the above-mentioned upper limit, a decrease in conductivity may occur due to a decrease in concentration of the π conjugated conductive polymer, which is not favorable.

Compounds Having a Glycidyl Group

Examples of the compounds having a glycidyl group include glycidyl compounds, such as, ethylglycidyl ether, butylglycidyl ether, t-butylglycidyl ether, aryl glycidyl ether, benzilglycidyl ether, glycidyl phenylether, bisphenol A, diglycidyl ether, glycidyl acrylate, glycidyl methacrylate, and the like.

It is preferable that the content of the compound having a glycidyl group based on 100 parts by mass of the total mass of the π conjugated conductive polymer and the polyanion be 10 to 10000 parts by mass, and more preferably 50 to 5000 parts by mass. If the content of the compound having a glycidyl group is less than the lower limit, effects of addition of the compound having a glycidyl group may deteriorate, which is not favorable. If the content is more than the above-mentioned upper limit, the decrease in the conductivity may occur due to the decrease in the concentration of the π conjugated conductive polymer, which is not favorable.

Organic Solvent

If an organic solvent partially remains in the solid electrolyte layer 13, the organic solvent serves as a conductive-enhancer. Examples of the organic solvent which can serve as a conductive-enhancer include: polar solvents, such as, N-methyl-2-pyrrolidone, N,N-dimethylformamide, N,N-dimethyl acetamide, dimethyl sulfoxide, hexamethylene phosphortriamide, N-vinylpyrrolidone, N-vinylformamide, N-vinyl acetamide, and the like; phenols, such as, cresol, phenol, xylenol, and the like; polyhydric aliphatic alcohols, such as, ethylene glycol, diethylene glycol, triethylene glycol, propylene glycol, dipropylene glycol, 1,3-butylene glycol, 1,4-butylene glycol, glycerin, diglycerin, D-glucose, D-glucitol, isoprene glycol, butanediol, 1,5-pentanediol, 1,6-hexanediol, 1,9-nonanediol, neopentyl glycol, and the like; carbonate compounds, such as, ethylene carbonate, propylene carbonate, and the like; ether compounds, such as, dioxane, diethylether, and the like; chain ethers, such as, dialkylether, propylene glycol dialkylether, polyethylene glycol dialkylether, polypropylene glycol dialkylether, and the like; heterocyclic compounds, such as, 3-methyl-2-oxazolidinone, and the like; and nitrile compounds, such as, acetonitrile, glutarodinitrile, methoxy acetonitrile, propionitrile, benzonitrile, and the like. These solvents may be used alone or in combination of two or more kinds thereof.

Such a conductive-enhancer can make the π conjugated conductive polymers approach each other by forming a hydrogen bonding between the polyanion and the π conjugated conductive polymer or utilizing the interaction therebetween. As a result, an energy level required for hopping, which is an electric conduction phenomenon between the π conjugated conductive polymers, is decreased, and thereby the total electrical resistance is decreased, and the conductivity is further increased.

It is preferable that the content of the organic solvent based on 100 parts by mass of the total mass of the π conjugated conductive polymer and the polyanion be 10 to 100000 parts by mass, and more preferably 50 to 10000 parts by mass.

(Dopant)

The solid electrolyte layer 13 may contain another dopant in addition to the polyanion, so as to further improve the conductivity of the π conjugated conductive polymer.

Examples of the other dopant include halogen compounds, Lewis acid, protic acid, and the like. Specific examples thereof include organic acids, such as organic carboxylate, organic sulfonate, and the like, organic cyano compounds, fullerene, fullerene hydride, fullerene hydroxide, fullerene carboxylate, sulfonated fullerene, and the like.

Examples of the organic acids include organic sulfonic acid compounds, such as, alkylbenzene sulfonate, alkylnaphthalene sulfonate, alkylnaphthalene disulfonate, naphthalene sulfonate-formalin polycondensates, melamine sulfonate-formalin polycondensates, naphthalene disulfonate, naphthalene trisulfonate, dinaphthylmethane disulfonate, anthraquinone sulfonate, anthraquinone disulfonate, anthracene sulfonate, pyrene sulfonate, and the like; and organic carboxylic compounds, such as, acetic acid, oxalic acid, benzoic acid, phthalic acid, maleic acid, fumaric acid, malonic acid, and the like. In addition, metallic salts thereof may be used.

Compounds having at least two cyano groups in the conjugated bond thereof may be used as the organic cyano compounds. Examples thereof include tetracyanoethylene, tetracyanoethylene oxide, tetracyanobenzene, dichloro dicyanobenzo quinone (DDQ), tetracyanoquinodimethane, tetracyanoazanaphthalene, and the like.

It is preferable that the content of the dopant compound based on 100 moles of the π conjugated conductive polymer be 10 to 10000 moles, and more preferably 30 to 3000 moles. If the content of the dopant compound is less than the lower limit, effects of formulation of the dopant compound deteriorate, which is not favorable. If the content is more than the above-mentioned upper limit, the decrease in the conductivity may occur due to the decrease in the concentration of the π conjugated conductive polymer, which is not favorable.

(Binder Resin)

The solid electrolyte layer 13 may contain a binder resin so as to modify the coating properties, the coating strength, and the like.

The binder resin is not particularly limited, provided that the binder resin is compatible with or dispersible in the π conjugated conductive polymer or the polyanion. The binder resin may be a thermosetting resin or a thermoplastic resin. Examples thereof include: polyesters, such as, polyethylene terephthalate, polybutylene terephthalate, polyethylene naphthalate, and the like; polyimides, such as, polyimide, polyamideimide, and the like; polyamides, such as, polyamide 6, polyamide 6,6, polyamide 12, polyamide 11, and the like; fluorocarbon polymers, such as, polyvinylidene-fluoride, polyvinyl-fluoride, polytetrafluoroethylene, ethylene tetrafluoroethylene copolymers, polychlorotrifluoroethylene, and the like; vinyl resins, such as, polyvinyl alcohol, polyvinyl ether, polyvinyl butyral, polyvinyl acetate, polyvinyl chloride, and the like; epoxy resins, xylene resins, aramid resins, polyurethanes, polyureas, melamine resins, phenol-based resins, polyethers, acrylic resins, copolymers thereof, and the like.

It is preferable that a water-soluble polymer or a water-dispersible polymer be used, since they exhibit excellent compatibility with the π conjugated conductive polymer and the polyanion. Both of the water-soluble polymer and the water-dispersible polymer have a hydrophilic group. Examples of the hydrophilic group include —CO—, —COOM-, —CONR—, —OH, —NR$_2$, —O—, —SO$_3$M, salts having such a group, and the like (R is a hydrogen atom or an organic group, and M is a hydrogen atom, an alkali metal, an alkaline-earth metal, a quaternary amine, or the like).

It is preferable that the content of the binder resin based on 100 parts by mass of the total mass of the π conjugated conductive polymer and the polyanion be 1 to 50000 parts by mass, more preferably 10 to 1000 parts by mass. If the content of the binder resin is less than the lower limit, the effects of the addition of the binder resin deteriorate, which is not favorable. If the content is more than the above-mentioned upper limit, a decrease in the conductivity may occur due to the decrease in the concentration of the π conjugated conductive polymer, which is not favorable.

(Silane Coupler)

Examples of the silane coupler include vinyltrichlorsilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxy propyl triethoxy silane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltriethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzil)-2-aminoethyl-3-aminopropyltrimethoxysilane hydrochloride, 3-ureidepropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, and the like.

An arbitrary amount of the silane coupler may be formulated, as needed, without any particular limitations. It is preferable that the content of the silane coupler based on 100 parts by mass of the total mass of the t conjugated conductive polymer and the polyanion be 10 to 10000 parts by mass.
(Acrylic Compound)

Examples of the acrylic compound include: monofunctional (meth)acrylate compounds, such as, acrylic acid, 2-hydroxyethyl methacrylate, 2-hydroxypropyl methacrylate, n-butoxyethyl methacrylate, n-butoxyethylene glycol methacrylate, methoxytriethylene glycol methacrylate, methoxypolyethylene glycol methacrylate, 2-hydroxyethyl acrylate, 2-hydroxypropyl acrylate, n-butoxyethyl acrylate, n-butoxyethylene glycol acrylate, methoxytriethylene glycol acrylate, methoxypolyethylene glycol acrylate, and the like; bifunctional (meth)acrylates, such as, ethylene glycol di(meth)acrylate, diethylene glycol di(meth)acrylate, triethylene glycol di(meth)acrylate, polyethylene glycol di(meth)acrylate, neopentyl glycol di(meth)acrylate, glycerin di(meth)acrylate, and the like; glycidyl ethers, such as, ethylene glycol diglycidyl ether, glycidyl ether, diethylene glycol diglycidyl ether, triethylene glycol diglycidyl ether, polyethylene glycol diglycidyl ether, propylene glycidyl ether, tripropylene glycidyl ether, polypropylene glycidyl ether, glycerin diglycidyl ether, and the like; 2-methacryloyloxy ethyl succinic acid, glycidyl methacrylate, trimethylol propane triacrylate, ethylene oxide-modified trimethylol propane triacrylate, ethylene oxide-modified pentaerythritol triacrylate, ethylene oxide-modified pentaerythritol tetraacrylate, and the like.

It is preferable that the content of the acrylic compound based on 100 parts by mass of the total mass of the π conjugated conductive polymer and the polyanion be 10 to 100000 parts by mass, more preferably 50 to 10000 parts by mass. If the content of the acrylic compound is less than the lower limit, the effects of the addition of the acrylic compound deteriorate, which is not favorable. If the content of the acrylic compound is more than the above-mentioned upper limit, a decrease in the conductivity may occur due to a decrease in the concentration of the π conjugated conductive polymer, which is not favorable.
(Water-Soluble Organic Solvent)

Examples of the water-soluble organic solvent include: polar solvents, such as, N-methyl-2-pyrrolidone, N-methyl acetamide, N,N-dimethylformamide, N,N-dimethyl acetamide, dimethylsulfoxide, hexamethylene phosphortriamide, N-vinylpyrrolidone, N-vinylformamide, N-vinyl acetamide, and the like; phenols, such as, cresol, phenol, xylenol, and the like; polyhydric aliphatic alcohols, such as, ethylene glycol, diethylene glycol, triethylene glycol, propylene glycol, dipropylene glycol, 1,3-butylene glycol, 1,4-butylene glycol, glycerin, diglycerin, D-glucose, D-glucitol, isoprene glycol, butanediol, 1,5-pentanediol, 1,6-hexanediol, 1,9-nonanediol, neopentyl glycol, and the like; carbonate compounds, such as, ethylene carbonate, propylene carbonate, and the like; ether compounds, such as, dioxane, diethylether, and the like; chain ethers, such as, dialkylether, propylene glycol dialkylether, polyethylene glycol dialkylether, polypropylene glycol dialkylether, and the like; heterocyclic compounds, such as, 3-methyl-2-oxazolidinone, and the like; nitrile compounds, such as, acetonitrile, glutarodinitrile, methoxy acetonitrile, propionitrile, benzonitrile, and the like. These solvents may be used alone or in combination of two or more kinds thereof.
(Water-Soluble Polymer Compound)

The water-soluble polymer compound is a compound in which the above-mentioned hydrophilic group is introduced into the main chain or the side chain thereof, and exhibits water-solubility. Specific examples of the water-soluble polymer compound include polyoxyalkylene, water-soluble polyurethane, water-soluble polyester, water-soluble polyamide, water-soluble polyimide, water-soluble polyacryl, water-soluble polyacrylamide, polyvinyl alcohol, polyacrylate, and the like.

Among the water-soluble polymer compounds, polyoxyalkylene is preferable, because the electric strength of the capacitor 10 is further enhanced. The polyoxyalkylene may have an end portion substituted with various substituents.

Specific examples of the polyoxyalkylene include diethylene glycol, triethylene glycol, oligo polyethylene glycol, triethylene glycol monochlorohydrin, diethylene glycol monochlorohydrin, oligo ethylene glycol monochlorohydrin, triethylene glycol monobromohydrin, diethylene glycol monobromohydrin, oligo ethylene glycol monobromohydrin, polyethylene glycol, glycidyl ethers, polyethylene glycolglycidyl ethers, polyethylene oxide, triethylene glycol-dimethylether, tetraethylene glycol-dimethylether, diethylene glycol-dimethylether, diethylene glycol-diethylether-diethylene glycol-dibutylether, dipropylene glycol, tripropylene glycol, polypropylene glycol, polypropylene dioxide, polyoxyethylenealkylether, polyoxyethyleneglycerin fatty acid ester, polyoxyethylene fatty acid amide, and the like.

Examples of the water-soluble polyurethane, water-soluble polyester, water-soluble polyamide, and water-soluble polyimide, respectively, include polymers in which a sulfonic group introduced into a substituted or unsubstituted polyurethane, a substituted or unsubstituted polyester, a substituted or unsubstituted polyamide, or a substituted or unsubstituted polyimide.

Examples of the water-soluble polyacryl include (co)polymers of the above-mentioned acrylic compounds.

The water-soluble polymer compound may be a homopolymer or a copolymer.

It is preferable that the mass average molecular weight of the water-soluble polymer compound be within the range of 100 to 5,000,000, and more preferably 400 to 1,000,000. If the mass average molecular weight of the water-soluble polymer compound is more than 5,000,000, the mixing performance in the conductive polymer solution deteriorates and the permeability into pores of the dielectric layer 12 deteriorates, and thereby an increase in the electric strength is difficult to achieve. If the mass average molecular weight is less than 100, the mobility in the solid electrolyte layer 13 is increased, and thereby the electric strength tends to decrease.

Among the water-soluble compounds, the water-soluble polymer compound is preferably used, because the electric strength is further increased.

The above-mentioned water-soluble compound also contributes to enhancing the conductivity of the solid electrolyte layer 13 by increasing the electrical conductivity of the π conjugated conductive polymer due to the interaction therewith. In other words, the water-soluble compound also serves as a conductive enhancer.
(Water-Dispersible Compound)

Examples of the water-dispersible compound include: compounds with a low hydrophilicity, each of the compounds having a portion substituted with a functional group with a high hydrophilicity; and substances in which a compound having a functional group with a high hydrophilicity is absorbed around a compound with a low hydrophilicity (such as emulsion or the like), the compounds and the substances being dispersible without precipitating in water.

Specific examples thereof include polyesters, polyurethanes, acrylic resins, silicone resins, emulsions thereof, and the like.

It is preferable that the particle size of the emulsion be smaller than the pore size of the dielectric layer 12, more preferably no more than half the size of the pore size, from the standpoint of the permeability into the dielectric layer 12.

The water-soluble compound and the water-dispersible compound may be used alone or in combination with two or more kinds thereof. If the water-soluble compound and the water-dispersible compound are used in combination of two or more kinds thereof, two or more kinds of the water-soluble compound or two or more kinds of the water-dispersible compound may be used, or one or more kind of the water-soluble compound and one or more kind of the water-dispersible compound may be used combinationally.

It is preferable that the content of the water-soluble compound and the water-dispersible compound be 1 to 10,000 parts by mass, more preferably 50 to 5,000 parts by mass, based on 100 parts by mass of the total mass of the π conjugated conductive polymer and the compound having a sulfonic group. If the content of the water-soluble compound and the water-dispersible compound is less than 1 part by mass, the electric strength of the capacitor 10 may not increase. If the content is more than 10,000 parts by mass, the conductivity of the solid electrolyte layer 13 tends to decrease, and the ESR of the capacitor 10 tends to increase.

(Alkaline Compound)

It is preferable that the solid electrolyte layer 13 contain an alkaline compound. If the solid electrolyte layer 13 contain an alkaline compound, dedoping of the compound having a sulfonic group from the π-conjugated conductive molecule is further prevented, and the conductivity is further enhanced.

Well-known inorganic alkaline compounds or organic alkaline compounds may be used as the alkaline compound. Examples of the inorganic alkaline compounds include sodium hydroxide, potassium hydroxide, hydroxide calcium, ammonia, and the like.

Preferable examples of the organic alkaline compounds include nitrogen-containing aromatic cyclic compounds (aromatic amine), aliphatic amines, metal alkoxides, and the like.

The above-exemplified nitrogen-containing aromatic cyclic compounds may be used as the nitrogen-containing aromatic cyclic compounds.

Examples of the aliphatic amine compounds include ethylamine, n-octylamine, diethylamine, diisobutylamine, methylethylamine, trimethylamine, triethylamine, arylamine, 2-ethylamino ethanol, 2,2'-iminodiethanol, N-ethylethylenediamine, and the like.

Examples of the metal alkoxides include: sodium alkoxides, such as, sodium methoxide, sodium ethoxide, and the like; potassium alkoxides, calcium alkoxides, and the like.

Among the alkaline compounds, the nitrogen-containing aromatic cyclic compound is preferably used. If the alkaline compound is the nitrogen-containing aromatic cyclic compound, the dedoping of the compound having a sulfonic group from the π-conjugated conductive molecule is particularly prevented, and the conductivity of the solid electrolyte layer 13 is particularly improved.

An arbitrary amount of the alkaline compound may be formulated without any particular limitations, provided that the pH of the conductive polymer solution at 25° C. can be adjusted within the range of 3 to 13.

(Cathode)

The cathode 14 is composed of layers made of carbon, silver, aluminium, or the like, for example. In the case where the cathode 14 is composed of carbon, silver, or the like, the cathode 14 may be formed using a conductive paste containing a conductive material, such as, carbon, silver, or the like.

In the case where the cathode 14 is composed of aluminium, the cathode 14 may be formed from an aluminium foil.

The above-mentioned solid electrolyte layer 13 of the capacitor 10 has a high conductivity, since the solid electrolyte layer 13 contains an ion-conductive compound and the like. Accordingly, the ESR of the capacitor 10 can be decreased.

The ion-conductive compound in the solid electrolyte layer 13 adheres or coordinates to the metal-oxide forming the dielectric layer 12, and thereby a layer of the ion-conductive compound is formed on the partial surface of the metal-oxide. This layer is considered to serve as a buffer which decreases the velocity of electrons or ions transferring between the electrodes due to an electric field. The decrease in the velocity of the transferring electrons or ions may contribute to an increase in the electric strength of the capacitor 10 by suppressing the damage on the anode 11 or the cathode 14 due to a collision thereof.

Defect portions in the dielectric layer 12 are considered to be recovered due to oxidation caused when an electric field is applied to the capacitor 10. According to the present invention, the ion-conductive compound in the solid electrolyte layer 13 serves as a source of oxygen supply at the time of oxidation, and thereby the dielectric layer 12 is easily recovered, which may contribute to an increase in the electric strength of the capacitor 10.

<Method (1) for Producing a Capacitor>

In the following, a method for producing the above-mentioned capacitor 10 will be explained with reference to some aspects thereof.

In one aspect of the method for producing the capacitor 10, a conductive polymer solution is applied to adhere on the surface of a dielectric layer 12 of an intermediary capacitor having an anode 11 and the dielectric layer 12, the dielectric layer 12 being an oxidized coating film formed by oxidizing the surface of the anode 11.

The conductive polymer solution used for the above contains a π conjugated conductive polymer, a polyanion, an ion-conductive compound, and a solvent, as essential components thereof.

Water and/or an organic solvent may be used as the solvent.

Examples of the organic solvent include: polar solvents, such as, N-methyl-2-pyrrolidone, N,N-dimethylformamide, N,N-dimethyl acetamide, dimethylsulfoxide, hexamethylene phosphortriamide, N-vinylpyrrolidone, N-vinylformamide, N-vinyl acetamide, and the like; phenols, such as, cresol, phenol, xylenol, and the like; polyhydric aliphatic alcohols, such as, ethylene glycol, diethylene glycol, triethylene glycol, propylene glycol, dipropylene glycol, 1,3-butylene glycol, 1,4-butylene glycol, glycerin, diglycerin, D-glucose, D-glucitol, isoprene glycol, butanediol, 1,5-pentanediol, 1,6-hexanediol, 1,9-nonanediol, neopentyl glycol, and the like; ketones, such as, acetone, methylethylketone, and the like; hydrocarbons, such as, hexane, benzene, toluene, and the like; carboxylic acids, such as, formic acid, acetic acid, and the like; carbonate compounds, such as, ethylene carbonate, propylene carbonate, and the like; ether compounds, such as, dioxane, diethylether, and the like; chain ethers, such as, dialkylether, propylene glycol dialkylether, polyethylene glycol dialkylether, polypropylene glycol dialkylether, and the like; heterocyclic compounds, such as, 3-methyl-2-oxazolidinone, and the like; and nitrile compounds, such as, acetonitrile, glutarodinitrile, methoxy acetonitrile, propionitrile, benzonitrile, and the like. These solvents may be used alone or in combination of two or more kinds thereof.

It is preferable that the content of the organic solvent based on 100 parts by mass of the total mass of the polyanion and the π conjugated conductive polymer be 1 to 10,000 parts by mass, more preferably 50 to 3,000 parts by mass.

The conductive polymer solution may contain other additives, as needed, so as to modify the coating suitability and the stability of the conductive polymer solution and the properties of a solid electrolyte layer 13. The additives are not particularly limited, provided that the additives can be mixed with the π conjugated conductive polymer and the polyanion. Examples of the additives include surfactants, antifoamers, couplers, antioxidants, and the like.

Examples of the surfactants include: anionic surfactants, such as, carboxylate salts, sulfonate salts, sulfuric ester salts, phosphoric ester salts, and the like; cationic surfactants, such as, amine salts, quaternary ammonium salts, and the like; ampholytic surfactants, such as, carboxybetaine, aminocarboxylate salt, imidazoliumbetaine, and the like; and nonionic surfactants, such as, polyoxyethylenealkylether, polyoxyethyleneglycerin fatty acid ester, ethylene glycol fatty acid ester, polyoxyethylene fatty acid amide, and the like.

Examples of the antifoamers include silicone resin, polydimethylsiloxane, silicone resin, and the like.

Examples of the couplers include silane couplers having a vinyl group, an amino group, an epoxy group, a methacryl group, or the like.

Examples of the antioxidants include phenol-based antioxidants, amine-based antioxidants, phosphorus-based antioxidants, sulfur-based antioxidants, sugars, vitamins, and the like.

It is preferable that the pH of the conductive polymer solution at 25° C. be within the range of 3 to 13, more preferably 5 to 11. If the pH of the conductive polymer solution is 3 or more, the corrosion of the dielectric layer 12 by the conductive polymer solution can be prevented. If the pH of the conductive polymer solution is more than 13, the conductivity of the π conjugated conductive polymer tends to decrease, which is not favorable.

An alkaline compound may be formulated so as to make the pH of the conductive polymer solution be within the range of 3 to 13. A well-known inorganic alkaline compound or organic alkaline compound may be used as the alkaline compound. Examples of the inorganic alkaline compound include sodium hydroxide, potassium hydroxide, calcium hydroxide, ammonia, and the like.

Preferable examples of the organic alkaline compound include nitrogen-containing aromatic cyclic compounds (aromatic amines), aliphatic amines, metal alkoxides, and the like.

The above-exemplified nitrogen-containing aromatic cyclic compounds may be used as the nitrogen-containing aromatic cyclic compounds.

Examples of the aliphatic amine compounds include: aliphatic amines, such as, dimethylamine, diethylamine, and the like; aromatic amine compounds, such as, imidazole, 2-methylimidazole, 1-hydroxyethylimidazole, 2,6-pyridine dimethanol, 2-pyridine carboxylate, and the like; sodium alkoxides, such as, sodium methoxide, sodium ethoxide, and the like; potassium alkoxides, calcium alkoxides, and the like.

In order to prepare the conductive polymer solution, a solution containing composites of the π conjugated conductive polymer and the polyanion is prepared by subjecting precursor monomers of the π conjugated conductive polymer to chemical oxidation polymerization in the solvent in the presence of the polyanion.

Then, an ion-conductive compound, and, as needed, arbitrary components, such as, a conductive-enhancer, an alkaline compound, or the like, were added to the solution containing the composites to obtain the conductive polymer solution.

A well-known method, such as, coating, immersion, spraying, or the like, may be adopted as a method for adhering the conductive polymer solution on the surface of the dielectric layer 12.

Then, the conductive polymer solution adhered on the dielectric layer 12 is dried to form the solid electrolyte layer 13. A well-known method, such as, drying at room temperature, drying with hot air, drying by far infrared radiation, or the like, may be adopted as a method for drying. The organic solvent in the conductive polymer solution is not always removed completely by such a drying method, and the organic solvent may partially remain in the solid electrolyte layer 13.

Then, a cathode 14 is formed by applying a carbon paste, silver paste, or the like, on the solid electrolyte layer 13, and thus a capacitor 10 is formed.

Since the solid electrolyte layer 13 is formed by adhering the conductive polymer solution containing the π conjugated conductive polymer on the dielectric layer 12 followed by drying the adhered conductive polymer solution in the abovementioned method for producing the capacitor 10, the steps thereof are easy and the high productivity is realized.

Since the solid electrolyte layer 13 is formed by the conductive polymer solution containing the ion-conductive compound, the conductivity of the solid electrolyte layer 13 is high, the ESR of the capacitor 10 is low, and the electric strength of the capacitor 10 is high.

<Method (2) for Producing a Capacitor>

Another aspect of the method for producing the capacitor 10 according to the present invention includes: a step (hereinafter, abbreviated as "Step A") in which a conductive polymer raw material solution is adhered on the surface of a dielectric layer 12 formed by subjecting the surface of an anode 11 made of a porous valve metal to oxidization (arbitrary chemical conversion treatment); a step (hereinafter, abbreviated as "Step B") in which a solid electrolyte layer 13 is formed by polymerizing precursor monomers of the π conjugated conductive polymer in the conductive polymer raw material solution adhered on the surface of the dielectric layer 12; and a step (hereinafter, abbreviated as "Step C") in which a cathode 14 is formed by applying a conductive paste on the solid electrolyte layer 13.

(Step A)

The conductive polymer raw material solution used in Step A contains the precursor monomers of the π conjugated conductive polymer, a compound having a sulfonic group, a water-soluble compound or a water-dispersible compound other than the compound having a sulfonic group, and a solvent.

Specific examples of the precursor monomers of the π conjugated conductive polymer include pyrrole, N-methylpyrrole, 3-methylpyrrole, 3-ethylpyrrole, 3-n-propylpyrrole, 3-butylpyrrole, 3-octylpyrrole, 3-decylpyrrole, 3-dodecylpyrrole, 3,4-dimethylpyrrole, 3,4-dibutylpyrrole, 3-carboxylpyrrole, 3-methyl-4-carboxylpyrrole, 3-methyl-4-carboxyethylpyrrole, 3-methyl-4-carboxybutylpyrrole, 3-hydroxypyrrole, 3-methoxypyrrole, 3-ethoxypyrrole, 3-butoxypyrrole, 3-hexyloxypyrrole, 3-methyl-4-hexyloxypyrrole, 3-methyl-4-hexyloxypyrrole, thiophene, 3-methylthiophene, 3-ethylthiophene, 3-propylthiophene, 3-butylthiophene, 3-hexylthiophene, 3-heptylthiophene, 3-octylthiophene, 3-decylthiophene, 3-dodecylthiophene, 3-octadecylthiophene, 3-bromothiophene, 3-chlorothiophene, 3-iodothiophene, 3-cyanothiophene, 3-phenylthiophene, 3,4-dimethylthiophene, 3,4-dibutylthiophene, 3-hydroxythiophene, 3-methoxythiophene, 3-ethoxythiophene, 3-butoxythiophene, 3-hexyloxythiophene, 3-heptyloxythiophene, 3-octyloxythiophene, 3-decyloxythiophene, 3-dodecyloxythiophene, 3-octadecyloxythiophene, 3,4-dihydroxythiophene, 3,4-dimethoxythiophene, 3,4-diethoxythiophene, 3,4-dipropoxy thiophene, 3,4-dibutoxythiophene, 3,4-dihexyloxythiophene, 3,4-diheptyloxythiophene, 3,4-dioctyloxythiophene, 3,4-didecyloxythiophene, 3,4-didodecyloxythiophene, 3,4-ethylenedioxythiophene, 3,4-propylenedioxythiophene, 3,4-butenedioxythiophene, 3-methyl-4-methoxythiophene, 3-methyl-4-ethoxythiophene, 3-carboxythiophene, 3-methyl-4-carboxythiophene, 3-methyl-4-carboxyethylthiophene, 3-methyl-4-carboxybutylthiophene, aniline, 2-methylaniline, 3-isobutylaniline, 2-aniline sulfonate, 3-aniline sulfonate, and the like.

As the compound having a sulfonic group, and the water-soluble compound or the water-dispersible compound, to be contained in the conductive polymer raw material solution, the same compounds as those of the solid electrolyte layer 13 may be used.

Water and/or an organic solvent may be used as the solvent. Examples of the organic solvent include: polar solvents, such as, N-methyl-2-pyrrolidone, N,N-dimethylformamide, N,N-dimethyl acetamide, dimethylsulfoxide, hexamethylene phosphortriamide, N-vinylpyrrolidone, N-vinylformamide, N-vinyl acetamide, and the like; phenols, such as, cresol, phenol, xylenol, and the like; polyhydric aliphatic alcohols, such as, ethylene glycol, diethylene glycol, triethylene glycol, propylene glycol, dipropylene glycol, 1,3-butylene glycol, 1,4-butylene glycol, glycerin, diglycerin, D-glucose, D-glucitol, isoprene glycol, butanediol, 1,5-pentanediol, 1,6-hexanediol, 1,9-nonanediol, neopentyl glycol, and the like; ketones, such as, acetone, methylethylketone, and the like; hydrocarbons, such as, hexane, benzene, toluene, and the like; carboxylic acids, such as, formic acid, acetic acid, and the like; carbonate compounds, such as, ethylene carbonate, propylene carbonate, and the like; ether compounds, such as, dioxane, diethylether, and the like; chain ethers, such as, dialkylether, propylene glycol dialkylether, polyethylene glycol dialkylether, polypropylene glycol dialkylether, and the like; heterocyclic compounds, such as, 3-methyl-2-oxazolidinone, and the like; and nitrile compounds, such as, acetonitrile, glutarodinitrile, methoxy acetonitrile, propionitrile, benzonitrile, and the like. These solvents may be used alone or in combination of two or more kinds thereof.

It is preferable that the content of the organic solvent based on 100 parts by mass of the total mass of the π conjugated conductive polymer and the compound having a sulfonic group be 1 to 50,000 parts by mass, more preferably 50 to 10,000 parts by mass.

Additives may be added to the conductive polymer raw material solution, as needed, so as to modify the coating suitability and the stability of the conductive polymer raw material solution and the properties of the solid electrolyte layer 13. The additives are not particularly limited, provided that the additives can be mixed with the π conjugated conductive polymer and the compound having a sulfonic group. Examples of the additives include surfactants, antifoamers, couplers, antioxidants, and the like.

Examples of the surfactants include: anionic surfactants, such as, carboxylate salts, sulfonate salts, sulfuric ester salts, phosphoric ester salts, and the like; cationic surfactants, such as, amine salts, quaternary ammonium salts, and the like; ampholytic surfactants, such as, carboxybetaine, aminocarboxylate salt, imidazoliumbetaine, and the like; and nonionic surfactants, such as, polyoxyethylenealkylether, polyoxyethyleneglycerin fatty acid ester, ethylene glycol fatty acid ester, polyoxyethylene fatty acid amide, and the like.

Examples of the antifoamers include silicone resins, polydimethylsiloxane, silicone resins, and the like.

Examples of the antioxidants include phenol-based antioxidants, amine-based antioxidants, phosphorus-based antioxidants, sulfur-based antioxidants, sugars, vitamins, and the like.

It is preferable that the pH of the conductive polymer raw material solution at 25° C. be within the range of 3 to 13, more preferably 5 to 11. If the pH of the conductive polymer raw material solution is 3 or more, the corrosion of the dielectric layer 12 or the cathode 14 by the conductive polymer raw material solution can be prevented. If the pH is more than 13, the conductivity of the π conjugated conductive polymer tends to decrease, which is not favorable.

The above-mentioned alkaline compound may be added so as to make the pH of the conductive polymer raw material solution be within the range of 3 to 13.

As a method for adhering the conductive polymer raw material solution on the surface of the dielectric layer 12 in Step A, a well-known method, such as, coating, immersion, spraying, or the like, may be adopted. The conductive polymer raw material solution may be adhered while reducing pressure or applying pressure, or by centrifuging.

(Step B)

An oxidation catalyst is usually used to polymerize the precursor monomers of the π conjugated conductive polymer at Step B. Examples of the oxidation catalyst include: peroxodisulfates, such as, ammonium peroxodisulfate (ammonium persulfate), sodium peroxodisulfate (sodium persulfate), potassium peroxodisulfate (potassium persulfate), and the like; transition-metal compounds, such as, ferric chloride, ferric sulfate, ferric nitrate, cupric chloride, and the like; metal halogen compounds, such as, boron trifluoride, and the like; metal-oxides, such as, silver oxide, caesium oxide, and the like; peroxides, such as, hydrogen peroxide, ozone, and the like; organic peroxides, such as, benzoyl peroxide, and the like; oxygen, and the like.

It is preferable that the oxidation catalyst be previously added to the conductive polymer raw material solution.

It is preferable that polymerization be performed while heating with a heater or the like. It is preferable that the heating temperature be 50 to 150° C.

The organic solvent can be volatilized by heating. However, the organic solvent in the conductive polymer raw material solution is not always removed completely by such a heating process, and the organic solvent may partially remain in the solid electrolyte layer 13.

After polymerization, impure ions may be removed by washing with ion-exchanged water.

(Step C)

Examples of the conductive paste used in Step C include carbon paste, silver paste, and the like.

According to the above-mentioned production method, the solid electrolyte layer 13 containing the π conjugated conductive polymer, the compound having a sulfonic group, and the water-soluble compound or the water-dispersible compound, can be formed. Thus, a capacitor 10 having a low ESR and a high degree of electric strength can be produced.

Another aspect of the method for producing the capacitor 10 according to the present invention include: a step (hereinafter, abbreviated as "Step D") in which a conductive polymer solution is adhered on the surface of a dielectric layer 12 formed by subjecting the surface of an anode 11 made of a porous valve metal to an oxidization treatment (an arbitrary chemical conversion treatment); a step (hereinafter, abbreviated as "Step E") in which a solid electrolyte layer 13 is formed by drying the conductive polymer solution adhered on the surface of the dielectric layer 12; and the above-mentioned Step C.

(Step D)

The conductive polymer solution to be used in Step D contains: a π conjugated conductive polymer; a polymer having a sulfonic group; either a water-soluble compound or a water-dispersible compound other than the polymer having a sulfonic group; and a solvent. As the π conjugated conductive polymer, the polymer having a sulfonic group, either the water-soluble compound or the water-dispersible compound, and the solvent, the above-mentioned ones may be used. In addition, the above-mentioned additives may be formulated in the conductive polymer solution.

As a method for preparing the conductive polymer solution, a method in which precursor monomers that can form a π conjugated conductive polymer is subjected to chemical oxidation polymerization in the solvent in the presence of the polymer having a sulfonic group to prepare a solution containing composites of the π conjugated conductive polymer and the polymer having a sulfonic group may be adopted, for example.

It is preferable that the pH of the conductive polymer solution at 25° C. be within the range of 3 to 13, more preferably 5 to 11. If the pH of the conductive polymer solution is 3 or more, the corrosion of the dielectric layer 12 by the conductive polymer solution can be prevented. If the pH is more than 13, the conductivity of the π conjugated conductive polymer tends to decrease, which is not favorable.

The above-mentioned alkaline compound may be formulated so as to make the pH of the conductive polymer solution be within the range of 3 to 13.

As a method for adhering the conductive polymer solution on the surface of the dielectric layer 12 in Step D, a well-known method, such as, coating, immersion, spraying, or the like, may be adopted.

(Step E)

As a method for drying the conductive polymer solution in Step E, a well-known method, such as, drying at room temperature, drying with hot air, drying by far infrared radiation, or the like, may be adopted. The organic solvent in the conductive polymer solution is not always removed completely by such a drying procedure, the organic solvent, depending on the kind thereof, may partially remain in the solid electrolyte layer 13.

According to the above-mentioned production method, the solid electrolyte layer 13 containing: the π conjugated conductive polymer; the compound having a sulfonic group; and the water-soluble compound or the water-dispersible compound, can be formed. Accordingly, a capacitor 10 having a low ESR and a high degree of electric strength can be produced.

In the case of a capacitor having both a dielectric layer formed by oxidizing the surface of an anode 11 by performing chemical conversion treatment and a conventional solid electrolyte layer containing a π conjugated conductive polymer, the obtainable maximum electric strength thereof is merely 30 to 40% of the formation voltage, the obtainable electrostatic capacity thereof is merely 60% of the specific electrostatic capacity, and the realization of both a high electrostatic capacity and a high degree of electric strength is difficult. In contrast, according to the present invention, a capacitor having the capacitance appearance ratio (%) and the ratio of "electric strength (V)/formation voltage (V)" falling within the above-mentioned specific range can be obtained, and both the electrostatic capacity and the electric strength can be increased without increasing the thickness of the solid electrolyte layer 13. Accordingly, a downsizing can be easily realized, and a high degree of electric strength, a low ESR, and a high electrostatic capacity can be realized.

Figure 2:
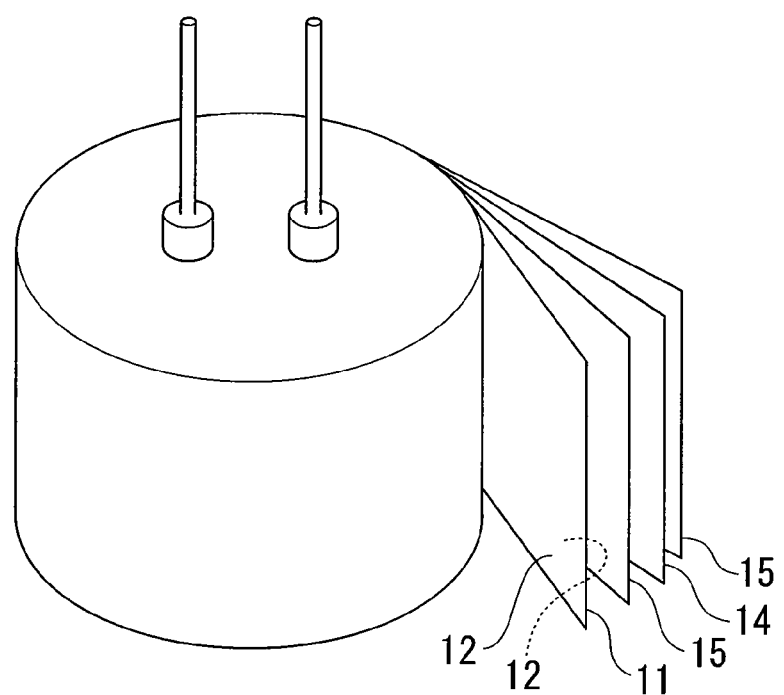
FIG. 2 is a perspective view illustrating another aspect of the capacitor according to the present invention.

The capacitor according to the present invention and the production method thereof are not limited to the above-mentioned aspects. For example, the capacitor according to the present invention may have a separator 15 between the dielectric layer 12 and the cathode 14 as shown in FIG. 2, as needed. The capacitor having the separator 15 between the dielectric layer 12 and the cathode 14 may be a rolled-type capacitor.

For example, the separator 15 may be a sheet (which may be a nonwoven cloth) of polyvinyl alcohol, polyester, polyethylene, polystyrene, polypropylene, polyimide, polyamide, polyvinylidene-fluoride, or the like, a glass fiber nonwoven cloth, or the like.

It is preferable that the separator 15 has a density of 0.1 to 1 $g/cm^3$, more preferably 0.2 to 0.8 $g/cm^3$.

If the separator 15 is formed, a method in which a cathode 14 is formed by impregnating the separator 15 with a carbon paste or a silver paste may be adopted.

In the capacitor according to the present invention, an electrolytic liquid may be used, as needed. The electrolytic liquid is not particularly limited, provided that the electrical conductivity thereof is high. The electrolytic liquid may be a liquid obtained by dissolving a well-known electrolyte in a well-known solvent for electrolytic liquid.

Examples of the solvent to be formulated in the electrolytic liquid include: alcohol-based solvents, such as, ethylene glycol, diethylene glycol, propylene glycol, 1,4-butanediol, glycerin, and the like; lactone-based solvents, such as, γ-butyrolactone, γ-valerolactone, δ-valerolactone, and the like; amide-based solvent, such as, N-methylformamide, N,N-dimethylformamide, N-methyl acetamide, N-methylpyrrolidinone, and the like; nitrile-based solvent, such as, acetonitrile, 3-methoxypropionitrile, and the like; water, and the like.

Examples of the electrolyte include electrolytes, each containing: as an anion component, adipic acid, glutaric acid, succinic acid, benzoic acid, isophthalic acid, phthalic acid, terephthalic acid, maleic acid, toluic acid, enanthic acid, malonic acid, formic acid, decane dicarboxylate such as 1,6-decane dicarboxylate or 5,6-decane dicarboxylate, octane dicarboxylate such as 1,7-octane dicarboxylate, an organic acid such as azelaic acid or sebacic acid, boracic acid, a complex compound of boracic acid and polyhydric alcohol, an inorganic acid such as phosphoric acid, carbonic acid, or silicic acid, or the like; and, as a cation component, a primary amine (methylamine, ethylamine, propylamine, butylamine, ethylenediamine, or the like), a secondary amine (dimethylamine, diethylamine, dipropylamine, methylethylamine, diphenylamine, or the like), a tertiary amine (trimethylamine, triethylamine, tripropylamine, triphenylamine, 1,8-diazabicyclo(5,4,0)-undecene 7, or the like), a tetraalkylammonium (tetramethylammonium, tetraethylammonium, tetrapropylammonium, tetrabutylammonium, methyltriethylammonium, dimethyldiethylammonium, or the like), or the like.

Although the cathode is provided in the above-mentioned aspects, the cathode is not always required to be provided separately if the solid electrolyte layer is used as a cathode. In such a case, the damage on the anode can be prevented and the electric strength can be increased, according to the present invention.

EXAMPLES

In the following, the present invention will be explained in more detail by illustrating examples and production examples. The pH values shown in the following examples were obtained by measuring at 25° C.

Example 1

(1) Preparation of Conductive Polymer Solution 14.2 g (0.1 mol) of 3,4-ethylenedioxythiophene were mixed at 20° C. with a solution obtained by dissolving 27.5 g (0.15 mol) of polystyrene sulfonate (molecular weight: about 150,000) in 2,000 ml of ion-exchanged water.

The thus obtained mixed solution was held at 20° C., and an oxidation catalyst solution in which 29.64 g (0.13 mol) of ammonium persulfate and 8.0 g (0.02 mol) of ferric sulfate were dissolved in 200 ml of ion-exchanged water was added to the mixed solution while stirring. Then, the mixture was reacted for 3 hours by stirring it.

The obtained reaction liquid was dialyzed to remove unreacted monomers, oxidants, and oxidation catalysts. Thus, a solution containing about 1.5% by mass of polystyrene sulfonate-doped poly(3,4-ethylenedioxythiophene) (hereinafter, abbreviated as "composite solution") was obtained.

0.36 g of 25% by mass of aqueous ammonia were added to 100 g of the composite solution while stirring, and then 4.5 g of polyethylene glycol 200(number average molecular weight: 200; n in Chemical Formula (I) is 3 to 4) were added to the mixture to obtain a conductive polymer solution having a pH of 8.5.

(2) Production of Capacitor

An anode lead terminal was connected to an etched aluminium foil (anode foil), and then a chemical conversion treatment (an oxidization treatment) was performed by applying a voltage of 100V in an aqueous solution containing 10% by mass of diammonium adipate to form a dielectric layer on the surface of the aluminium foil. Thus, an intermediary capacitor was obtained.

An opposite aluminium cathode foil to which a cathode lead terminal was welded was laminated on the anode foil of the intermediary capacitor via a cellulose separator, and the resultant was wound up to obtain a capacitor element.

Then, a procedure in which the capacitor element was impregnated with the conductive polymer solution prepared in the above step (1) under reduced pressure and then dried using a hot-air-dryer at 120° C. for 10 minutes was repeated three times to form a solid electrolyte layer on the dielectric layer-side surface of the intermediary capacitor.

Then, the capacitor element having the formed solid electrolyte layer was put in an aluminium case and the resultant was sealed with a sealing rubber to obtain a capacitor.

The electrostatic capacity of the obtained capacitor was measured using an LCZ meter 2345 (manufactured by N.F. Circuit Design Block Co., Ltd.) at 120 Hz, and the initial value of the equivalent series resistance (ESR) was measured using the same at 100 kHz.

In addition, the electric strength of the capacitor was measured as follows. The direct-current voltage was applied on both electrodes while raising the voltage at a rate of 0.2 V/second, and the voltage value when the current value became 0.4 A was measured to determine the electric strength value.

The measured results are shown in Table 1.

TABLE 1

|  | No. | pH of conductive polymer solution | Electrostatic capacity (μF) | ESR (mΩ) | Electric strength (V) |
| --- | --- | --- | --- | --- | --- |
| Example | 1 | 8.5 | 47 | 11 | 72 |
|  | 2 | 8.9 | 47 | 10 | 92 |
|  | 3 | 9.2 | 45 | 13 | 89 |
|  | 4 | 8.6 | 47 | 11 | 87 |
|  | 5 | 7.5 | 47 | 12 | 85 |
|  | 6 | 8.6 | 47 | 10 | 95 |
|  | 7 | 8.5 | 47 | 10 | 94 |
|  | 8 | 8.5 | 47 | 10 | 96 |
|  | 9 | 8.5 | 47 | 9 | 95 |
|  | 10 | 8.5 | 45 | 12 | 95 |
|  | 11 | 8.5 | 46 | 12 | 96 |
|  | 12 | 7.2 | 42 | 13 | 95 |
|  | 13 | 8.5 | 47 | 13 | 65 |
|  | 14 | 8.4 | 47 | 12 | 85 |
|  | 15 | 8.5 | 46 | 10 | 95 |
|  | 16 | 8.5 | 47 | 11 | 96 |
|  | 17 | 8.3 | 45 | 10 | 93 |
|  | 18 | 8.4 | 46 | 10 | 94 |
|  | 19 | 8.5 | 42 | 15 | 100 |
|  | 20 | 8.5 | 46 | 12 | 90 |
|  | 21 | 8.5 | 45 | 13 | 91 |
|  | 22 | 8.5 | 46 | 14 | 85 |
|  | 23 | 8.5 | 46 | 11 | 90 |
|  | 24 | 8.5 | 47 | 11 | 88 |
|  | 25 | 8.5 | 47 | 12 | 82 |
|  | 26 | 4.0 | 45 | 13 | 88 |
|  | 27 | 12.5 | 45 | 12 | 82 |

Example 2

A capacitor was produced in the same way as that of Example 1, except that 3.0 g of 1-(2-hydroxyethylimidazole) were added to 100 g of the composite solution prepared in Example 1 instead of 0.36 g of 25% by mass of aqueous ammonia and the amount of the polyethylene glycol 200 was changed to 9.0 g. Then, the electrostatic capacity, the ESR, and the electric strength were measured in the same way as that of Example 1. The measured results are shown in Table 1.

Example 3

A capacitor was produced in the same way as that of Example 1, except that 3.0 g of imidazole were added to 100 g of the composite solution prepared in Example 1 instead of 0.36 g of 25% by mass of aqueous ammonia, and 7.5 g of polyethylene glycol 6000 (number average molecular weight: 6,000; n in Chemical Formula (I) is 130 to 140) were added instead of 4.5 g of polyethylene glycol 200. Then, the electrostatic capacity, the ESR, and the electric strength were measured in the same way as that of Example 1. The measured results are shown in Table 1.

Example 4

A capacitor was produced in the same way as that of Example 1, except that 3.0 g of vinylimidazole were added to 100 g of the composite solution prepared in Example 1 instead of 0.36 g of 25% by mass of aqueous ammonia, and 7.5 g of polyethylene glycol 400 (number average molecular weight: 400; n in Chemical Formula (I) is 7 to 9) were added instead of 4.5 g of polyethylene glycol 200. Then, the electrostatic capacity, the ESR, and the electric strength were measured in the same way as that of Example 1. The measured results are shown in Table 1.

Example 5

A conductive polymer solution was prepared by adding 3% by mass of sodium hydroxide to 100 g of the composite solution prepared in Example 1 so as to adjust the pH thereof to 7.5, and then further adding 7.5 g of polyethylene glycol 400. A capacitor was produced in the same way as that of Example 1, except that the conductive polymer solution was used. Then, the electrostatic capacity, the ESR, and the electric strength were measured in the same way as that of Example 1. The measured results are shown in Table 1.

Example 6

A capacitor was produced in the same way as that of Example 1, except that 7.5 g of polyethylene glycol 400 were added to 100 g of the composite solution prepared in Example 1 instead of 4.5 g of polyethylene glycol 200. Then, the electrostatic capacity, the ESR, and the electric strength were measured in the same way as that of Example 1. The measured results are shown in Table 1.

Examples 7 to 16

A capacitor was produced in the same way as that of Example 1, except that, after 0.36 g of 25% by mass of aqueous ammonia were added to 100 g of the composite solution prepared in Example 1, 6.0 g of polyethylene glycol 600 were added, and then: 4.5 g of ethylene glycol were added in Example 7; 4.5 g of glycerin was added in Example 8; 6.0 g of tetraethylene glycol-dimethyl ether were added in Example 9; 4.5 g of ethylene glycol diglycidyl ether were added in Example 10; 4.5 g of acrylglycidyl ether were added in Example 11; 2.5 g of trihydroxybenzene were added in Example 12; 3.0 g of 4-sulfoisophthalic acid triammonium were added in Example 13; adipic acid ammonium was added in Example 14; 4.5 g of maleimide were added in Example 15; or 6.0 g of N,N-dimethylacrylamide were added in Example 16. Then, the electrostatic capacity, the ESR, and the electric strength were measured in the same way as that of Example 1. The measured results are shown in Table 1.

Examples 17 and 18

A capacitor was produced in the same way as that of Example 1, except that, after 0.36 g of 25% by mass of aqueous ammonia were added to 100 g of the composite solution prepared in Example 1, 6.0 g of polyethylene glycol 600 were added, and then: 7.5 g of dimethyl acetamide were added in Example 17; or 4.5 g of N-vinylpyrrolidone were added in Example 18. Then, the electrostatic capacity, the ESR, and the electric strength were measured in the same way as that of Example 1. The measured results are shown in Table 1.

Example 19

A capacitor was produced in the same way as that of Example 1, except that 7.5 g of polyethylene glycol 20000 (number average molecular weight: 20,000; n in Chemical Formula (I) is 450 to 470) were added after 0.36 g of 25% by mass of aqueous ammonia were added to 100 g of the composite solution prepared in Example 1. Then, the electrostatic capacity, the ESR, and the electric strength were measured in the same way as that of Example 1. The measured results are shown in Table 1.

Examples 20 and 21

A capacitor was produced in the same way as that of Example 1, except that, after 0.36 g of 25% by mass of aqueous ammonia were added to 100 g of the composite solution prepared in Example 1, 7.5 g of polyethylene glycol 700 (number average molecular weight: 700; n in Chemical Formula (I) is 14 to 18) were added in Example 20, or 7.5 g of polypropylene glycol 3000 (number average molecular weight: 3,000, n in Chemical Formula (I) is 50) were added in Example 21. Then, the electrostatic capacity, the ESR, and the electric strength were measured in the same way as that of Example 1. The measured results are shown in Table 1.

Example 22

A capacitor was produced in the same way as that of Example 1, except that 3.0 g of polyvinylpyrrolidone and 4.5 g of maleimide were added after 0.36 g of 25% by mass of aqueous ammonia were added to 100 g of the composite solution prepared in Example 1. Then, the electrostatic capacity, the ESR, and the electric strength were measured in the same way as that of Example 1. The measured results are shown in Table 1.

Example 23

A capacitor was produced in the same way as that of Example 1, except that 3.0 g of polyethylene oxide (number average molecular weight: 3,000; n in Chemical Formula (I) is 65 to 70) were added after 0.36 g of 25% by mass of aqueous ammonia were added to 100 g of the composite solution prepared in Example 1. Then, the electrostatic capacity, the ESR, and the electric strength were measured in the same way as that of Example 1. The measured results are shown in Table 1.

Example 24

A capacitor was produced in the same way as that of Example 1, except that 3.0 g of polyethylene oxide (number average molecular weight: 3,000; n in Chemical Formula (I) is 65 to 70) and 4.5 g of ethylene glycol were added after 0.36 g of 25% by mass of aqueous ammonia were added to 100 g of the composite solution prepared in Example 1. Then, the electrostatic capacity, the ESR, and the electric strength were measured in the same way as that of Example 1. The measured results are shown in Table 1.

Example 25

A capacitor was produced in the same way as that of Example 1, except that 3.0 g of polyacrylamide (number average molecular weight: 6,500) were added after 0.36 g of 25% by mass of aqueous ammonia were added to 100 g of the composite solution prepared in Example 1. Then, the electrostatic capacity, the ESR, and the electric strength were measured in the same way as that of Example 1. The measured results are shown in Table 1.

Example 26

A capacitor was produced in the same way as that of Example 1, except that 25% by mass of aqueous ammonia were added to 100 g of the composite solution prepared in Example 1 to adjust the pH thereof to 4, and then 7.5 g of polyethylene glycol (number average molecular weight: 600)

were added. Then, the electrostatic capacity, the ESR, and the electric strength were measured in the same way as that of Example 1. The measured results are shown in Table 1.

Example 27

A capacitor was produced in the same way as that of Example 1, except that 10% by mass of sodium hydroxide was added to 100 g of the composite solution prepared in Example 1 to adjust the pH thereof to 12.5, and then 7.5 g of polyethylene glycol (number average molecular weight: 600) were added. Then, the electrostatic capacity, the ESR, and the electric strength were measured in the same way as that of Example 1. The measured results are shown in Table 1.

Example 28

A conductive polymer solution having a pH of 8.5 was prepared in the same way as that of Example 1, except that 9 g of dipropylene glycol were added to 100 g of the composite solution instead of 4.5 g of polyethylene glycol 200. Then, the electrostatic capacity, the ESR, and the electric strength were measured in the same way as that of Example 1. The measured results are shown in Table 2.

TABLE 2

|  | No. | pH of conductive polymer solution | Electrostatic capacity (μF) | ESR (mΩ) | Electric strength (V) |
|---|---|---|---|---|---|
| Example | 28 | 8.5 | 47 | 20 | 80 |
|  | 29 | 8.5 | 46 | 60 | 90 |
|  | 30 | 8.5 | 47 | 44 | 80 |
|  | 31 | 8.5 | 47 | 44 | 85 |
|  | 32 | 8.5 | 47 | 18 | 100 |
|  | 33 | 8.5 | 47 | 18 | 100 |
|  | 34 | 8.5 | 47 | 18 | 100 |
|  | 35 | 8.5 | 47 | 25 | 100 |
|  | 36 | 8.5 | 45 | 21 | 100 |
|  | 37 | 8.5 | 48 | 16 | 85 |
|  | 38 | 8.5 | 48 | 17 | 95 |
|  | 39 | 8.5 | 48 | 15 | 95 |
|  | 40 | 8.5 | 48 | 16 | 90 |
|  | 41 | 8.5 | 48 | 18 | 80 |
|  | 42 | 8.5 | 46 | 23 | 90 |
|  | 43 | 8.5 | 47 | 20 | 90 |
|  | 44 | 8.5 | 47 | 18 | 90 |
|  | 45 | 8.5 | 48 | 21 | 100 |
|  | 46 | 8.5 | 48 | 20 | 90 |
|  | 47 | 8.5 | 47 | 17 | 80 |
|  | 48 | 8.5 | 47 | 17 | 80 |
|  | 49 | 8.5 | 47 | 21 | 100 |
|  | 50 | 8.5 | 47 | 18 | 100 |
|  | 51 | 8.5 | 47 | 85 | 100 |
|  | 52 | 8.5 | 47 | 90 | 100 |
|  | 53 | 8.5 | 46 | 115 | 100 |
|  | 54 | 8.5 | 47 | 63 | 85 |
| Comparative Example | 1 | 1.8 | 6 | 558 | 43 |
|  | 2 | 7.5 | 35 | 442 | 62 |
|  | 3 | 7.2 | 42 | 25 | 42 |

Example 29

A conductive polymer solution having a pH of 8.5 was prepared in the same way as that of Example 1, except that 9 g of polypropylene glycol 700 were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 30

A conductive polymer solution having a pH of 8.5 was prepared in the same way as that of Example 1, except that 9 g of polypropylene glycol 2000 were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 31

A conductive polymer solution having a pH of 8.5 was prepared in the same way as that of Example 1, except that 9 g of polypropylene glycol 3000 were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 32

A conductive polymer solution having a pH of 8.5 was prepared in the same way as that of Example 1, except that 6 g of EPOLIGHT 40E (manufactured by KYOEISHA CHEMICAL Co., LTD) were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 33

A conductive polymer solution having a pH of 8.5 was prepared in the same way as that of Example 1, except that 6 g of EPOLIGHT 100E (manufactured by KYOEISHA CHEMICAL Co., LTD) were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 34

A conductive polymer solution having a pH of 8.5 was prepared in the same way as that of Example 1, except that 6 g of EPOLIGHT 200E (manufactured by KYOEISHA CHEMICAL Co., LTD) were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 35

A conductive polymer solution having a pH of 8.5 was prepared in the same way as that of Example 1, except that 6 g of EPOLIGHT 400E (manufactured by KYOEISHA CHEMICAL Co., LTD) were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 36

A conductive polymer solution having a pH of 8.5 was prepared in the same way as that of Example 1, except that 6 g of EPOLIGHT 80MF (manufactured by KYOEISHA CHEMICAL Co., LTD) were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 37

A capacitor was produced in the same way as that of Example 1, except that 3.0 g of vinylimidazole were added to 100 g of the composite solution prepared in Example 1 instead of 0.36 g of 25% by mass of aqueous ammonia and 9 g of LIGHTACRYLATE MTG-A (manufactured by KYOEISHA CHEMICAL Co., LTD) were added thereto instead of 4.5 g of polyethylene glycol 200. Then, the electrostatic capacity, the ESR, and the electric strength were measured in the same way as that of Example 1. The measured results are shown in Table 2.

Example 38

A capacitor was produced in the same way as that of Example 1, except that 3.0 g of vinylimidazole were added to 100 g of the composite solution prepared in Example 1 instead of 0.36 g of 25% by mass of aqueous ammonia and 9 g of LIGHTACRYLATE 130-A (manufactured by KYOEISHA CHEMICAL Co., LTD) were added thereto instead of 4.5 g of polyethylene glycol 200. Then, the electrostatic capacity, the ESR, and the electric strength were measured in the same way as that of Example 1. The measured results are shown in Table 2.

Example 39

A capacitor was produced in the same way as that of Example 1, except that 3.0 g of vinylimidazole were added to 100 g of the composite solution prepared in Example 1 instead of 0.36 g of 25% by mass of aqueous ammonia and 9 g of LIGHTACRYLATE 3EG-A (manufactured by KYOEISHA CHEMICAL Co., LTD) were added thereto instead of 4.5 g of polyethylene glycol 200. Then, the electrostatic capacity, the ESR, and the electric strength were measured in the same way as that of Example 1. The measured results are shown in Table 2.

Example 40

A capacitor was produced in the same way as that of Example 1, except that 3.0 g of vinylimidazole were added to 100 g of the composite solution prepared in Example 1 instead of 0.36 g of 25% by mass of aqueous ammonia and 9 g of LIGHTACRYLATE 4EG-A (manufactured by KYOEISHA CHEMICAL Co., LTD) were added thereto instead of 4.5 g of polyethylene glycol 200. Then, the electrostatic capacity, the ESR, and the electric strength were measured in the same way as that of Example 1. The measured results are shown in Table 2.

Example 41

A capacitor was produced in the same way as that of Example 1, except that 3.0 g of vinylimidazole were added to 100 g of the composite solution prepared in Example 1 instead of 0.36 g of 25% by mass of aqueous ammonia and 9 g of LIGHTACRYLATE 14EG-A (manufactured by KYOEISHA CHEMICAL Co., LTD) were added thereto instead of 4.5 g of polyethylene glycol 200. Then, the electrostatic capacity, the ESR, and the electric strength were measured in the same way as that of Example 1. The measured results are shown in Table 2.

Example 42

A capacitor was produced in the same way as that of Example 1, except that 3.0 g of vinylimidazole were added to 100 g of the composite solution prepared in Example 1 instead of 0.36 g of 25% by mass of aqueous ammonia and 9 g of LIGHTESTER G (manufactured by KYOEISHA CHEMICAL Co., LTD) were added thereto instead of 4.5 g of polyethylene glycol 200. Then, the electrostatic capacity, the ESR, and the electric strength were measured in the same way as that of Example 1. The measured results are shown in Table 2.

Example 43

A capacitor was produced in the same way as that of Example 1, except that 3.0 g of vinylimidazole were added to 100 g of the composite solution prepared in Example 1 instead of 0.36 g of 25% by mass of aqueous ammonia and 9 g of LIGHTESTER 2EG (manufactured by KYOEISHA CHEMICAL Co., LTD) were added thereto instead of 4.5 g of polyethylene glycol 200. Then, the electrostatic capacity, the ESR, and the electric strength were measured in the same way as that of Example 1. The measured results are shown in Table 2.

Example 44

A capacitor was produced in the same way as that of Example 1, except that 3.0 g of vinylimidazole were added to 100 g of the composite solution prepared in Example 1 instead of 0.36 g of 25% by mass of aqueous ammonia and 9 g of LIGHTESTER 4EG (manufactured by KYOEISHA CHEMICAL Co., LTD) were added thereto instead of 4.5 g of polyethylene glycol 200. Then, the electrostatic capacity, the ESR, and the electric strength were measured in the same way as that of Example 1. The measured results are shown in Table 2.

Example 45

A capacitor was produced in the same way as that of Example 1, except that 3.0 g of vinylimidazole were added to 100 g of the composite solution prepared in Example 1 instead of 0.36 g of 25% by mass of aqueous ammonia and 9 g of LIGHTESTER 9EG (manufactured by KYOEISHA CHEMICAL Co., LTD) were added thereto instead of 4.5 g of polyethylene glycol 200. Then, the electrostatic capacity, the ESR, and the electric strength were measured in the same way as that of Example 1. The measured results are shown in Table 2.

Example 46

A capacitor was produced in the same way as that of Example 1, except that 3.0 g of vinylimidazole were added to 100 g of the composite solution prepared in Example 1 instead of 0.36 g of 25% by mass of aqueous ammonia and 9 g of LIGHTESTER 14EG (manufactured by KYOEISHA CHEMICAL Co., LTD) were added thereto instead of 4.5 g of polyethylene glycol 200. Then, the electrostatic capacity, the ESR, and the electric strength were measured in the same way as that of Example 1. The measured results are shown in Table 2.

Example 47

A capacitor was produced in the same way as that of Example 1, except that 3.0 g of vinylimidazole were added to 100 g of the composite solution prepared in Example 1 instead of 0.36 g of 25% by mass of aqueous ammonia and 9 g of LIGHTESTER G-101P (manufactured by KYOEISHA CHEMICAL Co., LTD) were added thereto instead of 4.5 g of polyethylene glycol 200. Then, the electrostatic capacity, the ESR, and the electric strength were measured in the same way as that of Example 1. The measured results are shown in Table 2.

Example 48

A capacitor was produced in the same way as that of Example 1, except that 3.0 g of vinylimidazole were added to 100 g of the composite solution prepared in Example 1 instead of 0.36 g of 25% by mass of aqueous ammonia and 9 g of hydroxyethyl acrylate were added thereto instead of 4.5 g of polyethylene glycol 200. Then, the electrostatic capacity, the ESR, and the electric strength were measured in the same way as that of Example 1. The measured results are shown in Table 2.

Example 49

A conductive polymer solution having a pH of 8.5 was prepared in the same way as that of Example 1, except that 6 g of silane coupler (manufactured by Shin-Etsu Chemical Co., Ltd., KBM-403) and 5 g of polyethylene glycol 400 were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 50

A conductive polymer solution having a pH of 8.5 was prepared in the same way as that of Example 1, except that 6 g of silane coupler (manufactured by Shin-Etsu Chemical Co., Ltd., KBM-503) and 5 g of polyethylene glycol 400 were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 51

A conductive polymer solution having a pH of 8.5 was prepared in the same way as that of Example 1, except that 3 g of polyurethane (manufactured by Dainichiseika Color & Chemicals Mfg. Co., Ltd., D6300) and 3 g of polyethylene glycol 400 were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 52

A conductive polymer solution having a pH of 8.5 was prepared in the same way as that of Example 1, except that 3 g of polyurethane (manufactured by Dainichiseika Color & Chemicals Mfg. Co., Ltd., D4080) and 3 g of polyethylene glycol 400 were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 53

A conductive polymer solution having a pH of 8.5 was prepared in the same way as that of Example 1, except that 3 g of polyurethane (manufactured by KUSUMOTO CHEMICALS, Ltd., R967) and 3 g of polyethylene glycol 400 were added to 100 g of the composite solution instead of 4.5 g of polyethylene glycol 200. Then, the electrostatic capacity, the ESR, and the electric strength were measured in the same way as that of Example 1. The measured results are shown in Table 2.

Example 54

A conductive polymer solution having a pH of 8.5 was prepared in the same way as that of Example 1, except that 3 g of polyurethane (manufactured by GOO CHEMICAL CO., LTD., Z-105) and 3 g of polyethylene glycol 400 were added to 100 g of the composite solution instead of 4.5 g of polyethylene glycol 200. Then, the electrostatic capacity, the ESR, and the electric strength were measured in the same way as that of Example 1. The measured results are shown in Table 2.

Comparative Example 1

A capacitor was produced in the same way as that of Example 1, except that the composite solution prepared in Example 1 was used as a conductive polymer solution without formulating any ion-conductive compounds. Then, the electrostatic capacity, the ESR, and the electric strength were measured in the same way as that of Example 1. The measured results are shown in Table 2.

Comparative Example 2

A capacitor was produced in the same way as that of Example 1, except that, after 0.36 g of 25% by mass of aqueous ammonia were added to 100 g of the composite solution prepared in Example 1, no ion-conductive compound was added thereto. Then, the electrostatic capacity, the ESR, and the electric strength were measured in the same way as that of Example 1. The measured results are shown in Table 2.

Comparative Example 3

A capacitor was produced in the same way as that of Example 1, except that after 0.36 g of 25% by mass of aqueous ammonia were added to 100 g of the composite solution prepared in Example 1, 2.5 g of trihydroxybenzene were added thereto, without adding any ion-conductive compounds thereto. Then, the electrostatic capacity, the ESR, and the electric strength were measured in the same way as that of Example 1. The measured results are shown in Table 2.

The capacitors obtained in Examples 1 to 54, each having a solid electrolyte layer containing the π conjugated conductive polymer, the polyanion, and the ion-conductive compound, exhibited a high degree of electric strength and a low ESR. In addition, the electrostatic capacity thereof was sufficient.

The capacitors obtained in Comparative Examples 1 to 3, each containing the π conjugated conductive polymer and the polyanion without containing any ion-conductive compounds, exhibited a low electric strength and a high ESR.

Production Example 1

(1) Preparation of Conductive Polymer Solution 14.2 g (0.1 mol) of 3,4-ethylenedioxythiophene were mixed at 20° C. with a solution obtained by dissolving 27.5 g (0.15 mol) of polystyrene sulfonate (molecular weight: about 150,000) in 2,000 ml of ion-exchanged water.

The thus obtained mixed solution was kept at 20° C., and an oxidation catalyst solution in which 29.64 g (0.13 mol) of ammonium persulfate and 8.0 g (0.02 mol) of ferric sulfate were dissolved in 200 ml of ion-exchanged water were added to the mixed solution while stirring, and then the mixture was stirred and reacted for 3 hours.

The obtained reaction liquid was dialyzed to remove unreacted monomers, oxidants, and oxidation catalysts. Thus, a solution containing about 1.5% by mass of polystyrene sulfonate-doped poly (3,4-ethylenedioxythiophene) (hereinafter, abbreviated as "composite solution") was obtained.

0.36 g of 25% by mass of aqueous ammonia were added to 100 g of the composite solution while stirring, and then 9.0 g of polyethylene glycol 400 (number average molecular weight: 400) as a water-soluble compound were added to the mixture to obtain a conductive polymer solution having a pH of 8.5.

(2) Production of Capacitor

An anode lead terminal was connected to an etched aluminium foil (anode foil), and then a chemical conversion treatment (an oxidization treatment) was performed by applying a voltage of 100V in an aqueous solution containing 10% by mass of diammonium adipate to form a dielectric layer on the surface of the aluminium foil. Thus, an intermediary capacitor was obtained.

An opposite aluminium cathode foil to which a cathode lead terminal was welded was laminated on the anode foil of the intermediary capacitor via a cellulose separator, and the resultant was wound up, and subjected to chemical conversion treatment (oxidation treatment) by applying the voltage of 100V in the aqueous solution containing 10% by mass of diammonium adipate again to obtain a capacitor element.

Then, a procedure in which the capacitor element was impregnated with the conductive polymer solution prepared in the above step (1) under reduced pressure and then dried using a hot-air-dryer at 120° C. for 10 minutes was repeated three times to form a solid electrolyte layer on the dielectric layer-side surface of the intermediary capacitor.

Then, the capacitor element having the formed solid electrolyte layer was immersed in an electrolytic solution to impregnate it under reduced pressure, and then the capacitor element was drawn up from the electrolytic solution, and put in an aluminium case. The resultant was sealed with a sealing rubber to obtain a capacitor. The electrolytic solution used in the above was prepared by adding 20 g of diammonium adipate to 80 g of γ-butyrolactone and then heating and dissolving the mixture at 120° C.

The electrostatic capacity of the obtained capacitor was measured using an LCZ meter 2345 (manufactured by N.F. Circuit Design Block Co., Ltd.) at 120 Hz, and the initial value of the equivalent series resistance (ESR) thereof was measured using the same at 100 kHz.

In addition, the electric strength of the capacitor was measured as follows. The direct-current voltage was applied on both electrodes at 25° C. while raising the voltage at a rate of 0.2 V/second, and the voltage value when the current value became 0.4A was measured to determine the electric strength value.

The measured results are shown in Table 3.

Production Examples 2 to 80

A capacitor was produced in the same way as that of Production Example 1, except that each compound shown in Tables 3 to 7 was used instead of polyethylene glycol 400 as a water-soluble compound. Then, the electrostatic capacity, the initial value of the ESR, and the electric strength were measured in the same way as that of Production Example 1. The measured results are shown in Tables 3 to 7.

TABLE 3

| Production Example No. | Additives | Additive amount (g) | Alkaline compound | Electrostatic capacity (μF) | ESR (mΩ) | Electric strength (V) |
|---|---|---|---|---|---|---|
| 1 | Polyethylene glycol 400 | 9 | Aqueous ammonia | 48 | 18 | 100 |
| 2 |  | 15 |  | 48 | 17 | 100 |
| 3 |  | 22.5 |  | 48 | 17 | 100 |
| 4 |  | 30 |  | 48 | 17 | 100 |
| 5 |  | 45 |  | 48 | 19 | 100 |
| 6 | Ethylene glycol | 9 |  | 46 | 23 | 75 |
| 7 | Diethylene glycol |  |  | 46 | 19 | 85 |
| 8 | Polyethylene glycol 200 |  |  | 47 | 17 | 95 |
| 9 | Polyethylene glycol 400 |  |  | 48 | 18 | 100 |
| 10 | Polyethylene glycol 600 |  |  | 48 | 18 | 90 |
| 11 | Polyethylene glycol 1000 |  |  | 48 | 18 | 100 |
| 12 | Polyethylene glycol 1500 |  |  | 47 | 18 | 100 |
| 13 | Polyethylene glycol 2000 |  |  | 48 | 19 | 90 |
| 14 | Polyethylene glycol 4000 |  |  | 48 | 20 | 100 |
| 15 | Polyethylene glycol 6000 |  |  | 48 | 21 | 95 |
| 16 | Polyethylene glycol 20000 |  |  | 48 | 23 | 100 |
| 17 | Glycerin |  |  | 47 | 21 | 90 |
| 18 | Diglycerin |  |  | 47 | 21 | 90 |
| 19 | Dipropylene glycol |  |  | 47 | 20 | 80 |
| 20 | Polypropylene glycolb 700 |  |  | 46 | 60 | 90 |
| 21 | Polypropylene glycol 2000 |  |  | 47 | 44 | 80 |
| 22 | Polypropylene glycol 3000 |  |  | 47 | 44 | 85 |

TABLE 4

| Production Example No. | Water-soluble compound | Additive amount (g) | Alkaline compound | Electrostatic capacity (μF) | ESR (mΩ) | Electric strength (V) |
|---|---|---|---|---|---|---|
| 23 | Polycarbonate-based polyurethane (Dainichiseika Color & Chemicals Mfg. Co., Ltd., D6300) | 6 | Aqueous ammonia | 47 | 85 | 100 |
| 24 | Polyether/polycarbonate-based polyurethane (Dainichiseika Color & Chemicals Mfg. Co., Ltd., D4080) | | | 47 | 90 | 100 |
| 25 | Polyether-based polyurethane (KUSUMOTO CHEMICALS, Ltd., R967) | | | 46 | 115 | 100 |
| 26 | Polyester-based polyurethane (KUSUMOTO CHEMICALS, Ltd., D9637) | | | 47 | 105 | 100 |
| 27 | Polyester (GOO CHEMICAL CO., LTD., Z-105) | | | 47 | 63 | 85 |
| 28 | Polyester (GOO CHEMICAL CO., LTD., Z-561) | | | 46 | 66 | 80 |
| 29 | Polyurethane (Dainichiseika Color & Chemicals Mfg. Co., Ltd., D6300) Polyethylene glycol 400 | 3<br>3 | | 47 | 85 | 100 |
| 30 | Polyurethane (Dainichiseika Color & Chemicals Mfg. Co., Ltd., D4080) Polyethylene glycol 400 | 3<br>3 | | 47 | 90 | 100 |
| 31 | Polyurethane (KUSUMOTO CHEMICALS, Ltd., R967) Polyethylene glycol 400 | 3<br>3 | | 46 | 115 | 100 |
| 32 | Polyurethane (KUSUMOTO CHEMICALS, Ltd., D9637) Polyethylene glycol 400 | 3<br>3 | | 47 | 105 | 100 |
| 33 | Polyester (GOO CHEMICAL CO., LTD., Z-105) Polyethylene glycol 400 | 3<br>3 | | 47 | 63 | 85 |

TABLE 5

| Production Example No. | Water-soluble compound | Additive amount (g) | Alkaline compound | Electrostatic capacity (μF) | ESR (mΩ) | Electric strength (V) |
|---|---|---|---|---|---|---|
| 34 | Epoxy compound (KYOEISHA CHEMICAL Co., LTD., EPOLIGHT 40E) | 6 | Aqueous ammonia | 47 | 18 | 100 |
| 35 | Epoxy compound (KYOEISHA CHEMICAL Co., LTD., EPOLIGHT 100E) | | | 47 | 18 | 100 |
| 36 | Epoxy compound (KYOEISHA CHEMICAL Co., LTD., EPOLIGHT 200E) | | | 47 | 18 | 100 |
| 37 | Epoxy compound (KYOEISHA CHEMICAL Co., LTD., EPOLIGHT 400E) | | | 47 | 25 | 100 |
| 38 | Epoxy compound (KYOEISHA CHEMICAL Co., LTD., EPOLIGHT 80MF) | | | 45 | 21 | 100 |
| 39 | Epoxy compound (KYOEISHA CHEMICAL Co., LTD., EPOLIGHT 40E) Hydroxyethyl acrylamide | 6<br>4 | | 47 | 15 | 90 |
| 40 | Polyacrylurethane (TIASEI FINE CHEMICAL CO., LTD., WEM-3021) Hydroxyethyl acrylamide | 6<br>4 | | 47 | 25 | 100 |
| 41 | Acrylic acid derivative (KYOEISHA CHEMICAL Co., LTD., LIGHTACRYLATE MTG-A) | 9 | Vinyl imidazole | 48 | 16 | 85 |
| 42 | Acrylic acid derivative (KYOEISHA CHEMICAL Co., LTD., LIGHTACRYLATE 130-A) | | | 48 | 17 | 95 |
| 43 | Acrylic acid derivative (KYOEISHA CHEMICAL Co., LTD., LIGHTACRYLATE 3EG-A) | | | 48 | 15 | 95 |
| 44 | Acrylic acid derivative (KYOEISHA CHEMICAL Co., LTD., LIGHTACRYLATE 4EG-A) | | | 48 | 16 | 90 |

TABLE 5-continued

| Production Example No. | Water-soluble compound | Additive amount (g) | Alkaline compound | Electrostatic capacity (μF) | ESR (mΩ) | Electric strength (V) |
|---|---|---|---|---|---|---|
| 45 | Acrylic acid derivative (KYOEISHA CHEMICAL Co., LTD., LIGHTACRYLATE 14EG-A) | | | 48 | 18 | 80 |
| 46 | Methacrylic acid derivative (KYOEISHA CHEMICAL Co., LTD., LIGHTESTER G) | | | 46 | 23 | 90 |
| 47 | Methacrylic acid derivative (KYOEISHA CHEMICAL Co., LTD., LIGHTESTER 2EG) | | | 47 | 20 | 90 |
| 48 | Methacrylic acid derivative (KYOEISHA CHEMICAL Co., LTD., LIGHTESTER 4EG) | | | 47 | 18 | 90 |
| 49 | Methacrylic acid derivative (KYOEISHA CHEMICAL Co., LTD., LIGHTESTER 9EG) | | | 48 | 21 | 100 |
| 50 | Methacrylic acid derivative (KYOEISHA CHEMICAL Co., LTD., LIGHTESTER 14EG) | | | 48 | 20 | 90 |
| 51 | Methacrylic acid derivative (KYOEISHA CHEMICAL Co., LTD., LIGHTESTER G-101P) | | | 47 | 17 | 80 |
| 52 | N,N-methylenebisacrylamide | | | 47 | 21 | 90 |

TABLE 6

| Production Example No. | Water-soluble compound | Additive amount (g) | Alkaline compound | Electrostatic capacity (μF) | ESR (mΩ) | Electric strength (V) |
|---|---|---|---|---|---|---|
| 53 | Imidazole | 2.4 | Absence | 47 | 26 | 70 |
| 54 | N-vinylimidazole | 3.6 | | 47 | 22 | 60 |
| 55 | N-aryl imidazole | 3.6 | | 47 | 18 | 75 |
| 56 | N-methylimidazole | 3.6 | | 47 | 26 | 60 |
| 57 | N-hydroxy ethylimidazole | 4.0 | | 47 | 21 | 75 |
| 58 | 1,2-dimethylimidazole | 3.6 | | 47 | 32 | 55 |
| 59 | 4-hydroxypyridine | 3.5 | | 47 | 23 | 65 |
| 60 | N-methyl-2-pyrrolidone | 9 | Aqueous ammonia | 47 | 21 | 80 |
| 61 | N-methyl acetamide | | | 47 | 19 | 80 |
| 62 | Dimethylformamide | | | 47 | 21 | 75 |
| 63 | Dimethylsulfoxide | | | 47 | 20 | 70 |
| 64 | N-vinylpyrrolidone | | | 47 | 20 | 75 |
| 65 | N-vinyl acetamide | | | 47 | 23 | 80 |
| 66 | Maleimide | | | 47 | 24 | 75 |
| 67 | Phthalimide | | | 47 | 40 | 80 |
| 68 | Thiodiethanol | | | 47 | 19 | 75 |
| 69 | Thiodiacetic acid | | | 47 | 55 | 50 |
| 70 | Ethylene carbonate | | | 47 | 37 | 85 |

TABLE 7

| Production Example No. | Water-soluble compound | Additive amount (g) | Alkaline compound | Electrostatic capacity (μF) | ESR (mΩ) | Electric strength (V) |
|---|---|---|---|---|---|---|
| 71 | Hydroxyethyl acrylamide | 9 | Aqueous ammonia | 47 | 16 | 75 |
| 72 | Hydroxyethyl acrylamide | | Vinyl imidazole | 46 | 18 | 70 |
| 73 | Diethylhydroxy acrylamide | | Vinyl imidazole | 47 | 16 | 80 |
| 74 | Silane coupler (Shin-Etsu Chemical Co., Ltd., KBM-403 | 6 | Aqueous ammonia | 47 | 35 | 95 |
| 75 | Silane coupler (Shin-Etsu Chemical Co., Ltd., KBM-503 | 6 | | 48 | 23 | 80 |

TABLE 7-continued

| Production Example No. | Water-soluble compound | Additive amount (g) | Alkaline compound | Electrostatic capacity (μF) | ESR (mΩ) | Electric strength (V) |
|---|---|---|---|---|---|---|
| 76 | Silane coupler (Shin-Etsu Chemical Co., Ltd., KBM-403 | 6 | | 47 | 21 | 100 |
| | Polyethylene glycol 400 | 5 | | | | |
| 77 | Silane coupler (Shin-Etsu Chemical Co., Ltd., KBM-503 | 6 | | 47 | 18 | 100 |
| | Polyethylene glycol 400 | 5 | | | | |
| 78 | Trihydroxybenzamide | 6 | Vinyl imidazole | 47 | 74 | 80 |
| 79 | Silicone emulsion (Shin-Etsu Chemical Co., Ltd., X-51-1302M) | 4 | | 46 | 44 | 100 |
| | Hydroxyethyl acrylamide | 7.5 | | | | |
| 80 | Silicone emulsion (Shin-Etsu Chemical Co., Ltd., X-52-2160) | 4 | | 47 | 20 | 100 |
| | Hydroxyethyl acrylamide | 7.5 | | | | |

Production Example 81

A capacitor was produced in the same way as that of production example 1, except that the composite solution containing neither polyethylene glycol 400 nor aqueous ammonia was used as a conductive polymer solution. Then, the electrostatic capacity, the initial value of the ESR, and the electric strength were measured in the same way as that of Production Example 1. The measured results are shown in Table 8.

Production Example 82

A capacitor was produced in the same way as that of production example 1, except that, after 0.36 g of 25% by mass of aqueous ammonia were added to 100 g of the composite solution prepared in Example 1, no polyethylene glycol 400 was added thereto. Then, the electrostatic capacity, the initial value of the ESR, and the electric strength were measured in the same way as that of Production Example 1. The measured results are shown in Table 8.

Production Example 83

A conductive polymer solution was attempted by adding 0.75 g of 25% by mass of vinylimidazole to 100 g of the composite solution, adding 3 g of a mixed solvent solution of methylethylketone and isopropanol in which 25% by mass of polyurethane was contained (manufactured by Arakawa Chemical Industries, Ltd.) thereto while stirring, and then further stirring the mixture for 3 hours. However, polyamide-imide that is neither a water-soluble polymer compound nor a water-dispersible polymer was deposited, no conductive polymer solution was obtained, and therefore impregnation of the capacitor element therewith could not be performed.

TABLE 8

| Production Example No. | Water-soluble compound | Alkaline compound | Electrostatic capacity (μF) | ESR (mΩ) | Electric strength (V) |
|---|---|---|---|---|---|
| 81 | Absence | Absence | 6 | 558 | 42 |
| 82 | | Aqueous ammonia | 35 | 442 | 62 |

Production Example 84

A conductive polymer raw material solution was prepared in a container by mixing 3,4-ethylenedioxythiophene with 45% by mass of iron (III) p-toluenesulfonate dissolved in a butanol solution so that the molar ratio thereof was 2:1, and then adding polyethylene glycol 400 thereto so that the additive amount thereof was four times the amount of 3,4-ethylenedioxythiophene. Then, the dielectric layer of the capacitor element was immersed in the conductive polymer raw material solution for 60 seconds, and then heated in a dryer at 120° C. for 1 hour to cause chemical oxidation polymerization and dry the resultant. Then, the resultant was washed with ion-exchanged water, and dried in a dryer at 120° C. to form a solid electrolyte layer.

Then, a capacitor was produced in the same way as that of Production Example 1. Then, the electrostatic capacity, the initial value of the ESR, and the electric strength were measured in the same way as that of Production Example 1. The measured results are shown in Table 9.

TABLE 9

| Production Example No. | Water-soluble compound | Electrostatic capacity (μF) | ESR (mΩ) | Electric strength (V) |
|---|---|---|---|---|
| 84 | Polyethylene glycol 400 | 47 | 30 | 90 |
| 85 | Thiodiethanol | 47 | 30 | 80 |
| 86 | Hydroxyethylacetamide | 47 | 35 | 80 |
| 87 | Hydroxyethylacrylate | 47 | 17 | 80 |
| 88 | Absence | 46 | 18 | 45 |

Production Example 85

A capacitor was produced in the same way as that of Production Example 84, except that thiodiethanol was used instead of polyethylene glycol 400. Then, the electrostatic capacity, the initial value of the ESR, and the electric strength were measured in the same way as that of Production Example 1. The measured results are shown in Table 9.

Production Example 86

A capacitor was produced in the same way as that of Production Example 84, except that hydroxyethyl acetamide was used instead of polyethylene glycol 400. Then, the electrostatic capacity, the initial value of the ESR, and the electric strength were measured in the same way as that of Production Example 1. The measured results are shown in Table 9.

Production Example 87

A capacitor was produced in the same way as that of Production Example 84, except that hydroxyethyl acrylate was used instead of polyethylene glycol 400. Then, the electrostatic capacity, the initial value of the ESR, and the electric strength were measured in the same way as that of Production Example 1. The measured results are shown in Table 9.

Production Example 88

A capacitor was produced in the same way as that of Production Example 84, except that no polyethylene glycol 400 was formulated. Then, the electrostatic capacity, the initial value of the ESR, and the electric strength were measured in the same way as that of Production Example 1. The measured results are shown in Table 9.

The capacitors each having a solid electrolyte layer containing a water-soluble compound, obtained in Production Examples 1 to 80 and Production Examples 84 to 87, exhibited a low ESR and a high degree of electric strength.

The capacitors each having a solid electrolyte layer free from any water-soluble compounds, obtained in Production Examples 81 to 82 and Production Example 88 exhibited a low electric strength.

Production Example 1'

(1) Preparation of Conductive Polymer Solution 14.2 g (0.1 mol) of 3,4-ethylenedioxythiophene were mixed at 20° C. with a solution obtained by dissolving 27.5 g (0.15 mol) of polystyrene sulfonate (molecular weight: about 150,000) in 2,000 ml of ion-exchanged water.

The thus obtained mixed solution was held at 20° C., and an oxidation catalyst solution in which 29.64 g (0.13 mol) of ammonium persulfate and 8.0 g (0.02 mol) of ferric sulfate were dissolved in 200 ml of ion-exchanged water was added to the mixed solution while stirring. Then, the mixture was reacted for 3 hours by stirring.

The obtained reaction liquid was dialyzed to remove unreacted monomers, oxidants, and oxidation catalysts. Thus, a solution containing about 1.5% by mass of polystyrene sulfonate-doped poly(3,4-ethylenedioxythiophene) (hereinafter, abbreviated as "composite solution") was obtained.

0.36 g of 25% by mass of aqueous ammonia were added to 100 g of the composite solution while stirring, and then 9.0 g of polyethylene glycol 400 (number average molecular weight: 400) were added to the mixture to obtain a conductive polymer solution having a pH of 8.5.

(2) Production of Capacitor

An anode lead terminal was connected to an etched aluminium foil (anode foil), and then a chemical conversion treatment (an oxidization treatment) was performed by applying a voltage of 100V in an aqueous solution containing 10% by mass of diammonium adipate to form a dielectric layer on the surface of the aluminium foil. Thus, an intermediary capacitor was obtained.

An opposite aluminium cathode foil to which a cathode lead terminal was welded was laminated on the anode foil of the intermediary capacitor via a cellulose separator, and the resultant was wound up, and subjected to chemical conversion treatment (oxidation treatment) by applying the voltage of 100V in the aqueous solution containing 10% by mass of diammonium adipate again to obtain a capacitor element.

Then, the capacitor element having the formed solid electrolyte layer was immersed in an electrolytic solution to impregnate it under reduced pressure, and then the capacitor element was drawn up from the electrolytic solution, and put in an aluminium case. The resultant was sealed with a sealing rubber to obtain a capacitor. The electrolytic solution used in the above was prepared by adding 20 g of diammonium adipate to 80 g of γ-butyrolactone and then heating and dissolving the mixture at 120° C.

The electrostatic capacity of the obtained capacitor was measured using an LCZ meter 2345 (manufactured by N.F. Circuit Design Block Co., Ltd.) at 120 Hz, and the initial value of the equivalent series resistance (ESR) thereof was measured using the same at 100 kHz.

In addition, the electric strength of the capacitor was measured as follows. A direct-current voltage was applied on both electrodes at 25° C. while raising the voltage at a rate of 0.2 V/second, and the voltage value when the current value became 0.4A was measured to determine the electric strength value.

The measured results are shown in Table 15.

Production Example 2'

A procedure in which the capacitor element was immersed in the conductive polymer solution prepared in the above (1) under reduced pressure and then dried at 120° C. using a hot-air-dryer for 10 minutes was repeatedly performed three times to form a solid electrolyte layer on the dielectric layer-side surface of the intermediary capacitor. Then, a capacitor was produced in the same way as that of Production Example 1', except that the capacitor element having the solid electrolyte layer formed in the above was used.

Then, the electrostatic capacity, the initial value of the ESR, and the electric strength were measured in the same way as that of Production Example 1'. The measured results are shown in Table 15. From the measured results, the capacitance appearance ratio (in other words, the ratio of "the measured electrostatic capacity/the electrostatic capacity obtained in Production Example 1") and the ratio of "electric strength (V)/formation voltage (V)" were calculated. The results are also shown in Table 15.

Production Examples 3' to 81'

A capacitor was produced in the same way as that of Production Example 1', except that each compound shown in Tables 10 to 14 was used instead of polyethylene glycol 400 as a water-soluble compound. Then, the electrostatic capacity, the initial value of the ESR, and the electric strength were measured in the same way as that of Production Example 1, and the capacitance appearance ratio and the ratio of "electric strength (V)/formation voltage (V)" were determined. The results are shown in Tables 15 to 19.

TABLE 10

| Production Example No. | Additives | Additive amount (g) | Alkaline compound |
|---|---|---|---|
| 2' | Polyethylene glycol 400 | 9 | Aqueous ammonia |
| 3' | | 15 | |
| 4' | | 22.5 | |
| 5' | | 30 | |
| 6' | | 45 | |
| 7' | Ethylene glycol | 9 | |
| 8' | Diethylene glycol | | |
| 9' | Polyethylene glycol 200 | | |
| 10' | Polyethylene glycol 400 | | |
| 11' | Polyethylene glycol 600 | | |
| 12' | Polyethylene glycol 1000 | | |
| 13' | Polyethylene glycol 1500 | | |
| 14' | Polyethylene glycol 2000 | | |
| 15' | Polyethylene glycol 4000 | | |
| 16' | Polyethylene glycol 6000 | | |
| 17' | Polyethylene glycol 20000 | | |
| 18' | Glycerin | | |
| 19' | Diglycerin | | |
| 20' | Dipropylene glycol | | |
| 21' | Polypropylene glycol 700 | | |
| 22' | Polypropylene glycol 2000 | | |
| 23' | Polypropylene glycol 3000 | | |

TABLE 11

| Production Example No. | Water-soluble compound | Additive amount (g) | Alkaline compound |
|---|---|---|---|
| 24' | Polycarbonate-based polyurethane (manufactured by Dainichiseika Color & Chemicals Mfg. Co., Ltd., D6300) | 6 | Aqueous ammonia |
| 25' | Polyether/polycarbonate-based polyurethane (manufactured by Dainichiseika Color & Chemicals Mfg. Co., Ltd., D4080) | | |
| 26' | Polyether-based polyurethane (manufactured by KUSUMOTO CHEMICALS, Ltd., R967) | | |
| 27' | Polyester-based polyurethane (manufactured by KUSUMOTO CHEMICALS, Ltd., D9637) | | |
| 28' | Polyester (manufactured by GOO CHEMICAL CO., LTD., Z-105) | | |
| 29' | Polyester (manufactured by GOO CHEMICAL CO., LTD., Z-561) | | |
| 30' | Polyurethane (manufactured by Dainichiseika Color & Chemicals Mfg. Co., Ltd., D6300) | 3 | |
| | Polyethylene glycol 400 | 3 | |
| 31' | Polyurethane (manufactured by Dainichiseika Color & Chemicals Mfg. Co., Ltd., D4080) | 3 | |
| | Polyethylene glycol 400 | 3 | |
| 32' | Polyurethane (manufactured by KUSUMOTO CHEMICALS, Ltd., R967) | 3 | |
| | Polyethylene glycol 400 | 3 | |
| 33' | Polyurethane (manufactured by KUSUMOTO CHEMICALS, Ltd., D9637) | 3 | |
| | Polyethylene glycol 400 | 3 | |

TABLE 11-continued

| Production Example No. | Water-soluble compound | Additive amount (g) | Alkaline compound |
|---|---|---|---|
| 34' | Polyester (manufactured by GOO CHEMICAL CO., LTD., Z-105) | 3 | |
| | Polyethylene glycol 400 | 3 | |

TABLE 12

| Production Example No. | Water-soluble compound | Additive amount (g) | Alkaline compound |
|---|---|---|---|
| 35' | Epoxy compound (manufactured by KYOEISHA CHEMICAL Co., LTD., EPOLIGHT 40E) | 6 | Aqueous ammonia |
| 36' | Epoxy compound (manufactured by KYOEISHA CHEMICAL Co., LTD., EPOLIGHT 100E) | | |
| 37' | Epoxy compound (manufactured by KYOEISHA CHEMICAL Co., LTD., EPOLIGHT 200E) | | |
| 38' | Epoxy compound (manufactured by KYOEISHA CHEMICAL Co., LTD., EPOLIGHT 400E) | | |
| 39' | Epoxy compound (manufactured by KYOEISHA CHEMICAL Co., LTD., EPOLIGHT 80MF) | | |
| 40' | Epoxy compound (manufactured by KYOEISHA CHEMICAL Co., LTD., EPOLIGHT 40E) | 6 | |
| | Hydroxyethyl acrylamide | 4 | |
| 41' | Polyacrylurethane (manufactured by TIASEI FINE CHEMICAL CO., LTD., WEM-3021) | 6 | |
| | Hydroxyethyl acrylamide | 4 | |
| 42' | Acrylic acid derivative (manufactured by KYOEISHA CHEMICAL Co., LTD., LIGHTACRYLATE MTG-A) | 9 | Vinyl imidazole |
| 43' | Acrylic acid derivative (manufactured by KYOEISHA CHEMICAL Co., LTD., LIGHTACRYLATE 130-A) | | |
| 44' | Acrylic acid derivative (manufactured by KYOEISHA CHEMICAL Co., LTD., LIGHTACRYLATE 3EG-A) | | |
| 45' | Acrylic acid derivative (manufactured by KYOEISHA CHEMICAL Co., LTD., LIGHTACRYLATE 4EG-A) | | |
| 46' | Acrylic acid derivative (manufactured by KYOEISHA CHEMICAL Co., LTD., LIGHTACRYLATE 14EG-A) | | |
| 47' | Methacrylic acid derivative (manufactured by KYOEISHA CHEMICAL Co., LTD., LIGHTESTER G) | | |
| 48' | Methacrylic acid derivative (manufactured by KYOEISHA CHEMICAL Co., LTD., LIGHTESTER 2EG) | | |
| 49' | Methacrylic acid derivative (manufactured by KYOEISHA CHEMICAL Co., LTD., LIGHTESTER 4EG) | | |
| 50' | Methacrylic acid derivative (manufactured by KYOEISHA | | |

TABLE 12-continued

| Production Example No. | Water-soluble compound | Additive amount (g) | Alkaline compound |
|---|---|---|---|
| | CHEMICAL Co., LTD., LIGHTESTER 9EG) | | |
| 51' | Methacrylic acid derivative (manufactured by KYOEISHA CHEMICAL Co., LTD., LIGHTESTER 14EG) | | |
| 52' | Methacrylic acid derivative (manufactured by KYOEISHA CHEMICAL Co., LTD., LIGHTESTER G-101P) | | |
| 53' | N,N-methylenebisacrylamide | | |

TABLE 13

| Production Example No. | Water-soluble compound | Additive amount (g) | Alkaline compound |
|---|---|---|---|
| 54' | Imidazole | 2.4 | Absence |
| 55' | N-vinylimidazole | 3.6 | |
| 56' | N-aryl imidazole | 3.6 | |
| 57' | N-methylimidazole | 3.6 | |
| 58' | N-hydroxyethylimidazole | 4.0 | |
| 59' | 1,2-dimethylimidazole | 3.6 | |
| 60' | 4-hydroxypyridine | 3.5 | |
| 61' | N-methyl-2-pyrrolidone | 9 | Aqueous ammonia |
| 62' | N-methyl acetamide | | |
| 63' | Dimethylformamide | | |
| 64' | Dimethylsulfoxide | | |
| 65' | N-vinylpyrrolidone | | |
| 66' | N-vinyl acetamide | | |
| 67' | Maleimide | | |
| 68' | Phthalimide | | |
| 69' | Thiodiethanol | | |
| 70' | Thiodiacetic acid | | |
| 71' | Ethylene carbonate | | |

TABLE 14

| Production Example No. | Water-soluble compound | Additive amount (g) | Alkaline compound |
|---|---|---|---|
| 72' | Hydroxyethyl acrylamide | 9 | Aqueous ammonia |
| 73' | Hydroxyethyl acrylamide | | Vinylimidazole |
| 74' | Diethylhydroxy acrylamide | | Vinylimidazole |
| 75' | Silane coupler (manufactured by Shin-Etsu Chemical Co., LTd., KBM-403) | 6 | Aqueous ammonia |
| 76' | Silane coupler (manufactured by Shin-Etsu Chemical Co., LTd., KBM-503) | 6 | |
| 77' | Silane coupler (manufactured by Shin-Etsu Chemical Co., LTd., KBM-403) Polyethylene glycol 400 | 6 / 5 | |
| 78' | Silane coupler (manufactured by Shin-Etsu Chemical Co., LTd., KBM-503) Polyethylene glycol 400 | 6 / 5 | |
| 79' | Trihydroxybenzamide | 6 | Vinylimidazole |
| 80' | Silicone emulsion (manufactured by Shin-Etsu Chemical Co., LTd., X-51-1302M) Hydroxyethyl acrylamide | 4 / 7.5 | |
| 81' | Silicone emulsion (manufactured by Shin-Etsu Chemical Co., LTd., X-52-2160) Hydroxyethyl acrylamide | 4 / 7.5 | |

TABLE 15

| Production Example No. | Electrostatic capacity (μF) | ESR (mΩ) | Electric strength (V) | Capacitance appearance ratio (%) | Electric strength (V)/ formation voltage (V) |
|---|---|---|---|---|---|
| 1' | 48 | 300 | 100 | — | 1.00 |
| 2' | 48 | 18 | 100 | 100 | 1.00 |
| 3' | 48 | 17 | 100 | 100 | 1.00 |
| 4' | 48 | 17 | 100 | 100 | 1.00 |
| 5' | 48 | 17 | 100 | 100 | 1.00 |
| 6' | 48 | 19 | 100 | 100 | 1.00 |
| 7' | 46 | 23 | 75 | 96 | 0.75 |
| 8' | 46 | 19 | 85 | 96 | 0.85 |
| 9' | 47 | 17 | 95 | 98 | 0.95 |
| 10' | 48 | 18 | 100 | 100 | 1.00 |
| 11' | 48 | 18 | 90 | 100 | 0.90 |
| 12' | 48 | 18 | 100 | 100 | 1.00 |
| 13' | 47 | 18 | 100 | 98 | 1.00 |
| 14' | 48 | 19 | 90 | 100 | 0.90 |
| 15' | 48 | 20 | 100 | 100 | 1.00 |
| 16' | 48 | 21 | 95 | 100 | 0.95 |
| 17' | 48 | 23 | 100 | 100 | 1.00 |
| 18' | 47 | 21 | 90 | 98 | 0.90 |
| 19' | 47 | 21 | 90 | 98 | 0.90 |
| 20' | 47 | 20 | 80 | 98 | 0.80 |
| 21' | 46 | 60 | 90 | 96 | 0.90 |
| 22' | 47 | 44 | 80 | 98 | 0.80 |
| 23' | 47 | 44 | 85 | 98 | 0.85 |

TABLE 16

| Production Example No. | Electrostatic capacity (μF) | ESR (mΩ) | Electric strength (V) | Capacitance appearance ratio (%) | Electric strength (V)/ formation voltage (V) |
|---|---|---|---|---|---|
| 24' | 47 | 85 | 100 | 98 | 1.00 |
| 25' | 47 | 90 | 100 | 98 | 1.00 |
| 26' | 46 | 115 | 100 | 96 | 1.00 |
| 27' | 47 | 105 | 100 | 98 | 1.00 |
| 28' | 47 | 63 | 85 | 98 | 0.85 |
| 29' | 46 | 66 | 80 | 96 | 0.80 |
| 30' | 47 | 85 | 100 | 98 | 1.00 |
| 31' | 47 | 90 | 100 | 98 | 1.00 |
| 32' | 46 | 115 | 100 | 96 | 1.00 |
| 33' | 47 | 105 | 100 | 98 | 1.00 |
| 34' | 47 | 63 | 85 | 98 | 0.85 |

TABLE 17

| Production Example No. | Electrostatic capacity (μF) | ESR (mΩ) | Electric strength (V) | Capacitance appearance ratio (%) | Electric strength (V)/ formation voltage (V) |
|---|---|---|---|---|---|
| 35' | 47 | 18 | 100 | 98 | 1.00 |
| 36' | 47 | 18 | 100 | 98 | 1.00 |
| 37' | 47 | 18 | 100 | 98 | 1.00 |
| 38' | 47 | 25 | 100 | 98 | 1.00 |
| 39' | 45 | 21 | 100 | 94 | 1.00 |
| 40' | 47 | 15 | 90 | 98 | 0.90 |

TABLE 17-continued

| Production Example No. | Electrostatic capacity (μF) | ESR (mΩ) | Electric strength (V) | Capacitance appearance ratio (%) | Electric strength (V)/ formation voltage (V) |
| --- | --- | --- | --- | --- | --- |
| 41' | 47 | 25 | 100 | 98 | 1.00 |
| 42' | 48 | 16 | 85 | 100 | 0.85 |
| 43' | 48 | 17 | 95 | 100 | 0.95 |
| 44' | 48 | 15 | 95 | 100 | 0.95 |
| 45' | 48 | 16 | 90 | 100 | 0.90 |
| 46' | 48 | 18 | 80 | 100 | 0.80 |
| 47' | 46 | 23 | 90 | 96 | 0.90 |
| 48' | 47 | 20 | 90 | 98 | 0.90 |
| 49' | 47 | 18 | 90 | 98 | 0.90 |
| 50' | 48 | 21 | 100 | 100 | 1.00 |
| 51' | 48 | 20 | 90 | 100 | 0.90 |
| 52' | 47 | 17 | 80 | 98 | 0.80 |
| 53' | 47 | 21 | 90 | 98 | 0.90 |

TABLE 18

| Production Example No. | Electrostatic capacity (μF) | ESR (mΩ) | Electric strength (V) | Capacitance appearance ratio (%) | Electric strength (V)/ formation voltage (V) |
| --- | --- | --- | --- | --- | --- |
| 54' | 47 | 26 | 70 | 98 | 0.70 |
| 55' | 47 | 22 | 60 | 98 | 0.60 |
| 56' | 47 | 18 | 75 | 98 | 0.75 |
| 57' | 47 | 26 | 60 | 98 | 0.60 |
| 58' | 47 | 21 | 75 | 98 | 0.75 |
| 59' | 47 | 32 | 55 | 98 | 0.55 |
| 60' | 47 | 23 | 65 | 98 | 0.65 |
| 61' | 47 | 21 | 80 | 98 | 0.80 |
| 62' | 47 | 19 | 80 | 98 | 0.80 |
| 63' | 47 | 21 | 75 | 98 | 0.75 |
| 64' | 47 | 20 | 70 | 98 | 0.70 |
| 65' | 47 | 20 | 75 | 98 | 0.75 |
| 66' | 47 | 23 | 80 | 98 | 0.80 |
| 67' | 47 | 24 | 75 | 98 | 0.75 |
| 68' | 47 | 40 | 80 | 98 | 0.80 |
| 69' | 47 | 19 | 75 | 98 | 0.75 |
| 70' | 47 | 55 | 50 | 98 | 0.50 |
| 71' | 47 | 37 | 85 | 98 | 0.85 |

TABLE 19

| Production Example No. | Electrostatic capacity (μF) | ESR (mΩ) | Electric strength (V) | Capacitance appearance ratio (%) | Electric strength (V)/ formation voltage (V) |
| --- | --- | --- | --- | --- | --- |
| 72' | 47 | 16 | 75 | 98 | 0.75 |
| 73' | 46 | 18 | 70 | 96 | 0.70 |
| 74' | 47 | 16 | 80 | 98 | 0.80 |
| 75' | 47 | 35 | 95 | 98 | 0.95 |
| 76' | 48 | 23 | 80 | 100 | 0.80 |
| 77' | 47 | 21 | 100 | 98 | 1.00 |
| 78' | 47 | 18 | 100 | 98 | 1.00 |
| 79' | 47 | 74 | 80 | 98 | 1.00 |
| 80' | 46 | 44 | 100 | 96 | 1.00 |
| 81' | 47 | 20 | 100 | 98 | 1.00 |

Production Example 82'

A capacitor was produced in the same way as that of Production Example 1', except that the composite solution was used as a conductive polymer solution without formulating polyethylene glycol 400 and aqueous ammonia therein. Then, the electrostatic capacity, the initial value of the ESR, and the electric strength were measured in the same way as that of Production Example 1', and the capacitance appearance ratio and the ratio of "electric strength (V)/formation voltage (V)" were determined. The results are shown in Table 20.

Production Example 83'

A capacitor was produced in the same way as that of Production Example 1', except that, after 0.36 g of 25% by mass of aqueous ammonia were added to 100 g of the composite solution prepared in Example 1, no polyethylene glycol 400 was added thereto. Then, the electrostatic capacity, the initial value of the ESR, and the electric strength were measured, and the capacitance appearance ratio and the ratio of "electric strength (V)/formation voltage (V)" were determined in the same way as that of Production Example 1'. The results are shown in Table 20.

Production Example 84'

A conductive polymer solution was attempted by adding 0.75 g of 25% by mass of vinylimidazole to 100 g of the composite solution, to which 3 g of a mixture solvent solution of methylethylketone and isopropanol in which 25% by mass of polyurethane was contained (manufactured by Arakawa Chemical Industries, Ltd.) were added while stirring, followed by further stirring the mixture for 3 hours. However, polyamideimide that is neither a water-soluble polymer compound nor a water-dispersible polymer was deposited, no conductive polymer solution was obtained, and therefor impregnation of the capacitor element therewith could not be performed.

TABLE 20

| Production Example No. | Water-soluble compound | Alkaline compound | Electrostatic capacity (μF) | ESR (mΩ) | Electric strength (V) | Capacitance appearance ratio (%) | Electric strength (V)/ formation voltage (V) |
| --- | --- | --- | --- | --- | --- | --- | --- |
| 82' | Absence | Absence | 6 | 558 | 42 | 13 | 0.42 |
| 83' | | Aqueous ammonia | 35 | 442 | 62 | 73 | 0.62 |

Production Example 85'

A conductive polymer raw material solution was prepared in a container by mixing 3,4-ethylenedioxythiophene with 45% by mass of iron (III) p-toluenesulfonate dissolved in a butanol solution so that the molar ratio thereof was 2:1, and then adding polyethylene glycol 400 thereto so that the additive amount thereof was four times the amount of 3,4-ethylenedioxythiophene. Then, the dielectric layer of the capacitor element was immersed in the conductive polymer raw material solution for 60 seconds, and then heated in a dryer at 120° C. for 1 hour to cause chemical oxidation polymerization and dry the resultant. Then, the resultant was washed with ion-exchanged water, and dried in a dryer at 120° C. to form a solid electrolyte layer.

Then, a capacitor was produced in the same way as that of Production Example 1'. Then, the electrostatic capacity, the initial value of the ESR, and the electric strength were measured, and the capacitance appearance ratio and the ratio of "electric strength (V)/formation voltage (V)" were determined in the same way as that of Production Example 1'. The measured results are shown in Table 21.

TABLE 21

| Production Example No. | Water-soluble compound | Electrostatic capacity (µF) | ESR (mΩ) | Electric strength (V) | Capacitance appearance ratio (%) | Electric strength (V)/ formation voltage (V) |
|---|---|---|---|---|---|---|
| 85' | Polyethylene glycol 400 | 47 | 30 | 90 | 98 | 0.90 |
| 86' | Thiodiethanol | 47 | 30 | 80 | 98 | 0.80 |
| 87' | Hydroxyethylacetamide | 47 | 35 | 80 | 98 | 0.80 |
| 88' | Hydroxyethylacrylate | 47 | 17 | 80 | 98 | 0.80 |
| 89' | Absence | 46 | 18 | 45 | 96 | 0.45 |

Production Example 86'

A capacitor was produced in the same way as that of Production Example 85', except that thiodiethanol was added instead of polyethylene glycol 400. Then, the electrostatic capacity, the initial value of the ESR, and the electric strength were measured, and the capacitance appearance ratio and the ratio of "electric strength (V)/formation voltage (V)" were determined in the same way as that of Production Example 1'. The measured results are shown in Table 21.

Production Example 87'

A capacitor was produced in the same way as that of Production Example 85', except that hydroxyethyl acetamide was added instead of polyethylene glycol 400. Then, the electrostatic capacity, the initial value of the ESR, and the electric strength were measured, and the capacitance appearance ratio and the ratio of "electric strength (V)/formation voltage (V)" were determined in the same way as that of Production Example 1'. The measured results are shown in Table 21.

Production Example 88'

A capacitor was produced in the same way as that of Production Example 85', except that hydroxyethyl acrylate was added instead of polyethylene glycol 400. Then, the electrostatic capacity, the initial value of the ESR, and the electric strength were measured, and the capacitance appearance ratio and the ratio of "electric strength (V)/formation voltage (V)" were determined in the same way as that of Production Example 1'. The measured results are shown in Table 21.

Production Example 89'

A capacitor was produced in the same way as that of Production Example 85', except that no polyethylene glycol 400 was formulated. Then, the electrostatic capacity, the initial value of the ESR, and the electric strength were measured, and the capacitance appearance ratio and the ratio of "electric strength (V)/formation voltage (V)" were determined in the same way as that of Production Example V. The measured results are shown in Table 21.

The capacitors, each having a capacitance appearance ratio of 70 to 100% and a ratio "electric strength (V)/formation voltage (V)" of 0.5 to 1.0, obtained in Production Examples 2' to 81' and Production Examples 85' to 88', could realize easy downsizing and exhibited a high degree of electric strength, a high electrostatic capacity, and a low ESR.

The capacitors, each having either a capacitance appearance ratio of less than 70% or a ratio "electric strength (V)/formation voltage (V)" of less than 0.5, obtained in Production Examples 82', 83', and 89', exhibited a low electric strength or a high ESR.

INDUSTRIAL APPLICABILITY

According to the present invention, a capacitor which can be readily downsized, and has a low ESR, a high degree of electric strength, and a high electrostatic capacity is provided. In addition, the production method according to the present invention enables easy production of a capacitor having a low ESR and a high degree of electric strength.

The invention claimed is:

1. A capacitor comprising:
   an anode made of a porous valve metal;
   a dielectric layer formed by oxidizing a surface of the anode; and
   a solid electrolyte layer formed on a surface of the dielectric layer,
   wherein the solid electrolyte layer comprises a π conjugated conductive polymer, a polyanion, an ion-conductive compound, and an alkaline compound, wherein
   the alkaline compound is selected from at least one of the group consisting of inorganic alkaline compounds, nitrogen-containing aromatic cyclic compounds, aliphatic amines and metal alkoxides;
   the ion-conductive compound is a compound having a structure represented by the following Chemical Formula (I):

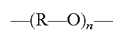

$$—(R—O)_n—  \quad (I)$$

(in the Chemical Formula (I), R represents at least one selected from the group consisting of substituted or unsubstituted alkylenes, substituted or unsubstituted alkenylenes, and substituted or unsubstituted phenylenes, and n represents an integer of 1 to 2,000), the ion-conductive compound has a number average molecular weight of 200 to 20000.

2. The capacitor according to claim 1, wherein the ion-conductive compound is a compound represented by the following Chemical Formula (II):

$$X\text{—}(R\text{—}O)_n\text{—}Y \qquad (II)$$

(in the Chemical Formula (II), R represents at least one selected from the group consisting of substituted or unsubstituted alkylenes, substituted or unsubstituted alkenylenes, and substituted or unsubstituted phenylenes, X represents at least one selected from the group consisting of a hydrogen atom, a hydroxyl group, substituted or unsubstituted alkyl groups, substituted or unsubstituted alkoxyl groups, substituted or unsubstituted alkenyl groups, substituted or unsubstituted aryl groups, substituted or unsubstituted glycidyl groups, substituted or unsubstituted (meth)acryloyl groups, and substituted or unsubstituted oxycarbonyl groups, Y represents at least one selected from the group consisting of a hydrogen atom, substituted or unsubstituted alkyl groups, substituted or unsubstituted alkenyl groups, substituted or unsubstituted aryl groups, substituted or unsubstituted glycidyl groups, substituted or unsubstituted (meth)acryloyl groups, and substituted or unsubstituted carbonyl groups, and n represents an integer of 1 to 2,000).

3. The capacitor according to claim 1, wherein the solid electrolyte layer further comprises at least one conductive-enhancer selected from the group consisting of nitrogen-containing aromatic cyclic compounds, compounds having at least two hydroxyl groups, compounds having at least two carboxyl groups, compounds having both at least one hydroxyl group and at least one carboxyl group, compounds having an amido group, compounds having an imido group, lactam compounds, and compounds having a glycidyl group.

4. The capacitor according to claim 1, wherein the alkaline compound is selected from at least one of the group consisting of ammonia, and imidazoles having at least two nitrogen atoms and derivatives thereof.

5. A capacitor comprising:
an anode made of a porous valve metal;
a dielectric layer formed by oxidizing a surface of the anode; and
a solid electrolyte layer formed on a surface of the dielectric layer,
wherein the solid electrolyte layer comprises:
a π conjugated conductive polymer,
a compound having a sulfonic group,
a water-soluble compound or a water-dispersible compound other than the compound having a sulfonic group, and
an alkaline compound, wherein
the alkaline compound is selected from at least one of the group consisting of inorganic alkaline compounds, nitrogen-containing aromatic cyclic compounds, aliphatic amines and metal alkoxides.

6. The capacitor according to claim 5, wherein the water-soluble compound is a water-soluble polymer compound.

7. The capacitor according to claim 5, wherein the alkaline compound is selected from at least one of the group consisting of ammonia, and imidazoles having at least two nitrogen atoms and derivatives thereof.

8. A capacitor comprising:
an anode made of a porous valve metal;
a dielectric layer formed by oxidizing a surface of the anode by performing a chemical conversion treatment; and
a solid electrolyte layer formed on a surface of the dielectric layer, and
the solid electrolyte layer comprising an alkaline compound, wherein
the alkaline compound is selected from at least one of the group consisting of inorganic alkaline compounds, nitrogen-containing aromatic cyclic compounds, aliphatic amines and metal alkoxides,
wherein a capacitance appearance ratio obtained in accordance with the following Numerical Formula (I):

capacitance appearance ratio(%)=(electrostatic capacity($F$)/specific electrostatic capacity ($F$)) ×100   Numerical Formula (I)

is 70 to 100%, and a ratio "electric strength (V)/formation voltage (V)" is 0.5 to 1.0;
wherein the solid electrolyte layer further comprises:
a π conjugated conductive polymer;
a compound having a sulfonic group; and
a water-soluble compound or a water-dispersible compound other than the compound having a sulfonic group.

9. The capacitor according to claim 8, wherein the water-soluble compound is a water-soluble polymer compound.

10. The capacitor according to claim 8, wherein the alkaline compound is selected from at least one of the group consisting of ammonia, and imidazoles having at least two nitrogen atoms and derivatives thereof.

11. A method for producing a capacitor, comprising:
applying a conductive polymer solution comprising a π conjugated conductive polymer, a polyanion, an ion-conductive compound, an alkaline compound, and a solvent on a surface of a dielectric layer formed by oxidizing a surface of an anode made of a porous valve metal; and
drying the conductive polymer solution applied on the surface of the dielectric layer, wherein the step of applying further comprises:
selecting the alkaline compound from at least one of the group consisting of inorganic alkaline compounds, nitrogen-containing aromatic cyclic compounds, aliphatic amines and metal alkoxides.

12. The method for producing a capacitor according to claim 11, wherein a pH of the conductive polymer solution at 25° C. is 3 to 13.

13. The method for producing a capacitor according to claim 11, wherein the alkaline compound is selected from at least one of the group consisting of ammonia, and imidazoles having at least two nitrogen atoms and derivatives thereof.

14. A method for producing a capacitor comprising:
applying a conductive polymer solution comprising a π conjugated conductive polymer, a polymer having a sulfonic group, a water-soluble compound or a water-dispersible compound other than the polymer having a sulfonic group, an alkaline compound, and a solvent, on a surface of a dielectric layer formed by oxidizing a surface of an anode made of a porous valve metal; and
drying the conductive polymer solution applied on the surface of the dielectric layer, wherein the step of applying further comprises:

selecting the alkaline compound from at least one of the group consisting of inorganic alkaline compounds, nitrogen-containing aromatic cyclic compounds, aliphatic amines and metal alkoxides.

15. The method for producing a capacitor according to claim 14, wherein a pH of the conductive polymer solution at 25° C. is 3 to 13.

16. The method for producing a capacitor according to claim 14, wherein the alkaline compound is selected from at least one of the group consisting of ammonia, and imidazoles having at least two nitrogen atoms and derivatives thereof.

* * * * *